United States Patent
Hatta et al.

(10) Patent No.: US 12,498,692 B2
(45) Date of Patent: Dec. 16, 2025

(54) WORK SUPPORT DEVICE AND WORK SUPPORT METHOD

(71) Applicant: Mitsubishi Electric Corporation, Tokyo (JP)

(72) Inventors: Toshiyuki Hatta, Tokyo (JP); Haruhisa Okuda, Tokyo (JP)

(73) Assignee: MITSUBISHI ELECTRIC CORPORATION., Tokyo (JP)

( * ) Notice: Subject to any disclaimer, the term of this patent is extended or adjusted under 35 U.S.C. 154(b) by 518 days.

(21) Appl. No.: 17/923,236

(22) PCT Filed: Jun. 18, 2020

(86) PCT No.: PCT/JP2020/023983
§ 371 (c)(1),
(2) Date: Nov. 4, 2022

(87) PCT Pub. No.: WO2021/255901
PCT Pub. Date: Dec. 23, 2021

(65) Prior Publication Data
US 2023/0075705 A1    Mar. 9, 2023

(51) Int. Cl.
*G05B 19/406*    (2006.01)
*G05B 19/418*    (2006.01)
(Continued)

(52) U.S. Cl.
CPC ......... *G05B 19/406* (2013.01); *G05B 19/418* (2013.01); *G06F 18/22* (2023.01);
(Continued)

(58) Field of Classification Search
CPC ..... G05B 19/406; G05B 19/418; G06F 18/22; G06Q 50/04; G06T 7/001;
(Continued)

(56) References Cited

U.S. PATENT DOCUMENTS

2011/0295655 A1*  12/2011  Tsuji .............. G06Q 10/10
                                                709/224
2013/0073261 A1*  3/2013   Kim .............. G06F 18/251
                                                702/189
(Continued)

FOREIGN PATENT DOCUMENTS

EP    2172820 A1 *  4/2010  .......... G05B 13/042
JP    2007-156838 A    6/2007
(Continued)

OTHER PUBLICATIONS

International Search Report and Written Opinion mailed on Sep. 15, 2020, received for PCT Application PCT/JP2020/023983, filed on Jun. 18, 2020, 8 pages including English Translation.
(Continued)

*Primary Examiner* — Alicia M. Choi
(74) *Attorney, Agent, or Firm* — XSENSUS LLP

(57) ABSTRACT

A work support device supports work including a series of operations performed by a working entity and includes: a sensor data input device receiving a sensor data string in which sensor data obtained by measuring work of the working entity is arranged in order of acquisition; a class data calculator calculating a class data string indicating sections obtained by dividing the sensor data string by comparing the sensor data string with a template that is set for each class as a type of temporal change of the sensor data and is a set including a probability distribution of the sensor data at each time; a reliability calculator calculating reliability for each section based on information on the sections indicated by the class data string; a reliability determiner determining whether the reliability satisfies criterion and generating information on operation included in the section in which the reliability satisfies the criterion.

15 Claims, 25 Drawing Sheets

(51) Int. Cl.
*G06F 18/22* (2023.01)
*G06Q 50/04* (2012.01)
*G06T 7/00* (2017.01)

(52) U.S. Cl.
CPC .............. *G06Q 50/04* (2013.01); *G06T 7/001* (2013.01); *G06T 2207/30164* (2013.01)

(58) Field of Classification Search
CPC .......... G06T 2207/30164; G06V 20/52; G06V 40/28; Y02P 90/02; Y02P 90/30; G06N 20/00
See application file for complete search history.

(56) References Cited

U.S. PATENT DOCUMENTS

| | | | | |
|---|---|---|---|---|
| 2015/0178548 | A1* | 6/2015 | Abdallah | G06F 21/6209 |
| | | | | 382/124 |
| 2017/0103506 | A1* | 4/2017 | Dandibhotla | G06F 18/2411 |
| 2019/0164110 | A1* | 5/2019 | Shiraishi | G06N 20/20 |
| 2020/0403818 | A1* | 12/2020 | Daredia | G10L 17/00 |
| 2021/0056646 | A1* | 2/2021 | Yoshimoto | G06Q 50/04 |
| 2021/0065255 | A1* | 3/2021 | Chang | G06F 16/22 |
| 2021/0133442 | A1* | 5/2021 | Wang | G06V 20/52 |
| 2021/0174225 | A1* | 6/2021 | Mino | G06N 20/00 |
| 2021/0174974 | A1* | 6/2021 | Mino | G16Y 40/35 |
| 2021/0406688 | A1* | 12/2021 | Ok | G06V 10/774 |
| 2022/0215327 | A1* | 7/2022 | Kitazumi | G06Q 50/04 |

FOREIGN PATENT DOCUMENTS

| | | | |
|---|---|---|---|
| JP | 2011184121 A | * | 9/2011 |
| JP | 2017-10276 A | | 1/2017 |
| JP | 2018-156279 A | | 10/2018 |

OTHER PUBLICATIONS

Feng et al., "Progressive Sequence Alignment as a Prerequisite to Correct Phylogenetic Trees", Journal of Molecular Evolution, vol. 25, 1987, pp. 351-360.

* cited by examiner

| n | x(n) | |
|---|---|---|
| 1 | 1.84 | -8.60 |
| 2 | 1.94 | -6.44 |
| ⋮ | ⋮ | ⋮ |
| 5 | 2.26 | 6.00 |

SD2

| n | x(n) | |
|---|---|---|
| 1 | 1.84 | -8.60 |
| 2 | 1.94 | -6.44 |
| ⋮ | ⋮ | ⋮ |
| 10 | 0.42 | 4.62 |

SD3

| n | x(n) | |
|---|---|---|
| 1 | 1.84 | -8.60 |
| 2 | 1.94 | -6.44 |
| ⋮ | ⋮ | ⋮ |
| 15 | 1.41 | 3.86 |

SD4

| n | x(n) | |
|---|---|---|
| 1 | 1.84 | -8.60 |
| 2 | 1.94 | -6.44 |
| ⋮ | ⋮ | ⋮ |
| 20 | 0.13 | -4.71 |

FIG.6

| f | STD(f) ||
|---|---|---|
|   | STDb(f) | STDc(f) |
| 1 | 8 | 1 |
| 2 | 8 | 2 |
| 3 | 5 | 3 |
| 4 | 8 | 4 |
| 5 | 8 | 5 |
| 6 | 6 | 6 |
| 7 | 9 | 7 |
| 8 | 7 | 8 |
| 9 | 7 | 9 |
| 10 | 7 | 10 |

FIG.7

| f | LABEL(f) |
|---|---|
| 1 | "TAKE OUT COMPONENT A" |
| 2 | "ASSEMBLE COMPONENT A" |
| 3 | "TAKE OUT COMPONENT B" |
| 4 | "ASSEMBLE COMPONENT B" |
| 5 | "TAKE OUT COMPONENT C" |
| 6 | "ASSEMBLE COMPONENT C" |
| 7 | "SCREW COMPONENT C" |
| 8 | "TAKE OUT COMPONENT D" |
| 9 | "ASSEMBLE COMPONENT D" |
| 10 | "PUT FINISHED PRODUCT IN BOX" |

FIG.9

| j | i | $g_j(i)$ ||
| --- | --- | --- | --- |
| | | $\mu_j(i)$ | $\sigma_j^2(i)$ |
| 1 | 1 | 1.15 | -4.78 | 10.49 |
| | 2 | 1.54 | -1.45 | 10.42 |
| | 3 | 1.97 | 3.71 | 10.42 |
| | ⋮ | ⋮ | ⋮ | ⋮ |
| | 20 | 1.56 | 2.31 | 11.28 |
| 2 | 1 | 1.36 | 2.17 | 10.52 |
| | 2 | 1.34 | 2.13 | 10.44 |
| | 3 | 1.48 | 2.19 | 10.44 |
| | ⋮ | ⋮ | ⋮ | ⋮ |
| | 20 | 1.40 | 1.93 | 11.27 |
| 3 | 1 | 0.30 | -3.71 | 10.50 |
| | 2 | 0.29 | -4.75 | 10.42 |
| | 3 | -0.30 | -5.89 | 10.42 |
| | ⋮ | ⋮ | ⋮ | ⋮ |
| | 20 | -1.12 | -3.68 | 11.34 |
| ⋮ | ⋮ | ⋮ | ⋮ | ⋮ |
| 10 | 1 | -3.17 | -6.28 | 10.53 |
| | 2 | -5.30 | -9.52 | 10.45 |
| | 3 | -6.11 | -14.08 | 10.45 |
| | ⋮ | ⋮ | ⋮ | ⋮ |
| | 20 | -3.16 | -10.82 | 11.31 |

FIG.11

|   | j'=1 | j'=2 | j'=3 | j'=4 | j'=5 | j'=6 | j'=7 | j'=8 | j'=9 | j'=10 |
|---|---|---|---|---|---|---|---|---|---|---|
| j=1 | 0.10 | 0.01 | 0.01 | 0.01 | 0.01 | 0.01 | 0.01 | 0.10 | 0.01 | 0.10 |
| j=2 | 0.74 | 0.01 | 0.10 | 0.01 | 0.01 | 0.01 | 0.01 | 0.01 | 0.01 | 0.10 |
| j=3 | 0.01 | 0.91 | 0.01 | 0.01 | 0.01 | 0.01 | 0.01 | 0.01 | 0.01 | 0.10 |
| j=4 | 0.01 | 0.01 | 0.83 | 0.24 | 0.01 | 0.01 | 0.01 | 0.01 | 0.01 | 0.10 |
| j=5 | 0.01 | 0.01 | 0.01 | 0.70 | 0.01 | 0.01 | 0.01 | 0.01 | 0.01 | 0.10 |
| j=6 | 0.01 | 0.01 | 0.01 | 0.01 | 0.91 | 0.01 | 0.01 | 0.01 | 0.01 | 0.10 |
| j=7 | 0.01 | 0.01 | 0.01 | 0.01 | 0.01 | 0.91 | 0.01 | 0.01 | 0.01 | 0.10 |
| j=8 | 0.01 | 0.01 | 0.01 | 0.01 | 0.01 | 0.01 | 0.91 | 0.01 | 0.11 | 0.10 |
| j=9 | 0.01 | 0.01 | 0.01 | 0.01 | 0.01 | 0.01 | 0.01 | 0.83 | 0.01 | 0.10 |
| j=10 | 0.10 | 0.01 | 0.01 | 0.01 | 0.01 | 0.01 | 0.01 | 0.01 | 0.81 | 0.10 |

| m | $s_m$ | | |
|---|---|---|---|
|   | $a_m$ | $b_m$ | $c_m$ |
| 1 | 1 | 5 | 3 |

CD2

| m | $s_m$ | | |
|---|---|---|---|
|   | $a_m$ | $b_m$ | $c_m$ |
| 1 | 1 | 10 | 1 |

CD3

| m | $s_m$ | | |
|---|---|---|---|
|   | $a_m$ | $b_m$ | $c_m$ |
| 1 | 1 | 2 | 10 |
| 2 | 3 | 13 | 1 |

CD4

| m | $s_m$ | | |
|---|---|---|---|
|   | $a_m$ | $b_m$ | $c_m$ |
| 1 | 1 | 9 | 1 |
| 2 | 10 | 8 | 2 |
| 3 | 18 | 3 | 3 |

| m | $s_m$ | | | $l_m$ |
|---|---|---|---|---|
| | $a_m$ | $b_m$ | $c_m$ | |
| 1 | 1 | 5 | 3 | 3 |

DL2

| m | $s_m$ | | | $l_m$ |
|---|---|---|---|---|
| | $a_m$ | $b_m$ | $c_m$ | |
| 1 | 1 | 10 | 1 | 1 |

DL3

| m | $s_m$ | | | $l_m$ |
|---|---|---|---|---|
| | $a_m$ | $b_m$ | $c_m$ | |
| 1 | 1 | 2 | 10 | 10 |
| 2 | 3 | 13 | 1 | 1 |

DL4

| m | $s_m$ | | | $l_m$ |
|---|---|---|---|---|
| | $a_m$ | $b_m$ | $c_m$ | |
| 1 | 1 | 9 | 1 | 1 |
| 2 | 10 | 8 | 2 | 2 |
| 3 | 18 | 3 | 3 | 3 |

| m | $s_m$ | | | $l_m$ | $V_m$ | |
|---|---|---|---|---|---|---|
| | $a_m$ | $b_m$ | $c_m$ | | $Vb_m$ | $Vc_m$ |
| 1 | 1 | 5 | 3 | 3 | "NORMAL" | "NORMAL" |

DV2

| m | $s_m$ | | | $l_m$ | $V_m$ | |
|---|---|---|---|---|---|---|
| | $a_m$ | $b_m$ | $c_m$ | | $Vb_m$ | $Vc_m$ |
| 1 | 1 | 10 | 1 | 1 | "NORMAL" | "NORMAL" |

DV3

| m | $s_m$ | | | $l_m$ | $V_m$ | |
|---|---|---|---|---|---|---|
| | $a_m$ | $b_m$ | $c_m$ | | $Vb_m$ | $Vc_m$ |
| 1 | 1 | 2 | 10 | 10 | "NORMAL" | "NORMAL" |
| 2 | 3 | 13 | 1 | 1 | "ABNORMAL" | "NORMAL" |

DV4

| m | $s_m$ | | | $l_m$ | $V_m$ | |
|---|---|---|---|---|---|---|
| | $a_m$ | $b_m$ | $c_m$ | | $Vb_m$ | $Vc_m$ |
| 1 | 1 | 9 | 1 | 1 | "NORMAL" | "NORMAL" |
| 2 | 10 | 8 | 2 | 2 | "NORMAL" | "NORMAL" |
| 3 | 18 | 3 | 3 | 3 | "NORMAL" | "NORMAL" |

| m | $s_m$ | | | $R_m$ |
|---|---|---|---|---|
| | $a_m$ | $b_m$ | $c_m$ | |
| 1 | 1 | 5 | 3 | 1 |

DR2

| m | $s_m$ | | | $R_m$ |
|---|---|---|---|---|
| | $a_m$ | $b_m$ | $c_m$ | |
| 1 | 1 | 10 | 1 | 1 |

DR3

| m | $s_m$ | | | $R_m$ |
|---|---|---|---|---|
| | $a_m$ | $b_m$ | $c_m$ | |
| 1 | 1 | 2 | 10 | 2 |
| 2 | 3 | 13 | 1 | 1 |

DR4

| m | $s_m$ | | | $R_m$ |
|---|---|---|---|---|
| | $a_m$ | $b_m$ | $c_m$ | |
| 1 | 1 | 9 | 1 | 3 |
| 2 | 10 | 8 | 2 | 2 |
| 3 | 18 | 3 | 3 | 1 |

| m | $s_m$ | | | $R_m$ | $R_m>2$ |
|---|---|---|---|---|---|
| | $a_m$ | $b_m$ | $c_m$ | | |
| 1 | 1 | 5 | 3 | 1 | False |

DJ2

| m | $s_m$ | | | $R_m$ | $R_m>2$ |
|---|---|---|---|---|---|
| | $a_m$ | $b_m$ | $c_m$ | | |
| 1 | 1 | 10 | 1 | 1 | False |

DJ3

| m | $s_m$ | | | $R_m$ | $R_m>2$ |
|---|---|---|---|---|---|
| | $a_m$ | $b_m$ | $c_m$ | | |
| 1 | 1 | 2 | 10 | 2 | False |
| 2 | 3 | 13 | 1 | 1 | False |

DJ4

| m | $s_m$ | | | $R_m$ | $R_m>2$ |
|---|---|---|---|---|---|
| | $a_m$ | $b_m$ | $c_m$ | | |
| 1 | 1 | 9 | 1 | 3 | True |
| 2 | 10 | 8 | 2 | 2 | False |
| 3 | 18 | 3 | 3 | 1 | False |

| n2 | | Hx(n2) |
|---|---|---|
| 1 | 1.84 | -8.60 |
| 2 | 1.94 | -6.44 |
| ⋮ | ⋮ | ⋮ |
| 9 | 2.59 | 7.09 |

FIG.20

| m2 | Hs$_{m2}$ | | | HI$_{m2}$ | HV$_{m2}$ | |
|---|---|---|---|---|---|---|
| | Ha$_{m2}$ | Hb$_{m2}$ | Hc$_{m2}$ | | HVb$_{m2}$ | HVc$_{m2}$ |
| 1 | 1 | 9 | 1 | 1 | "NORMAL" | "NORMAL" |

| m2 | Hs$_{m2}$ | | | Hl$_{m2}$ | HV$_{m2}$ | |
| --- | --- | --- | --- | --- | --- | --- |
| | Ha$_{m2}$ | Hb$_{m2}$ | Hc$_{m2}$ | | HVb$_{m2}$ | HVc$_{m2}$ |
| 1 | 1 | 9 | 1 | 1 | "NORMAL" | "NORMAL" |
| 2 | 10 | 8 | 2 | 2 | "NORMAL" | "NORMAL" |
| 3 | 18 | 6 | 3 | 3 | "NORMAL" | "NORMAL" |
| 4 | 24 | 14 | 4 | 4 | "ABNORMAL" | "NORMAL" |
| 5 | 38 | 9 | 5 | 5 | "NORMAL" | "NORMAL" |
| 6 | 47 | 6 | 6 | 6 | "NORMAL" | "NORMAL" |
| 7 | 53 | 8 | 8 | 8 | "NORMAL" | "NORMAL" |
| 8 | 61 | 6 | 4 | NA | "NORMAL" | "ABNORMAL" |
| 9 | 67 | 7 | 9 | 9 | "NORMAL" | "NORMAL" |
| 10 | 74 | 9 | 10 | 10 | "NORMAL" | "NORMAL" |
| 11 | 83 | 7 | 2 | 2 | "NORMAL" | "NORMAL" |
| 12 | 90 | 6 | 3 | 3 | "NORMAL" | "NORMAL" |

| d | CVhead(d) | CVtail(d) | CVlen(d) | CVmiss(d) |
| --- | --- | --- | --- | --- |
| 1 | 1 | 10 | 82 | {"SCREW COMPONENT C"} |
| 2 | 11 | 12 | 13 | {"TAKE OUT COMPONENT A"} |

FIG.28

| m2 | LABEL(m2) | HVb$_{m2}$ | HVc$_{m2}$ | d | CVlen(d) [sec] | CVmiss(d) |
|---|---|---|---|---|---|---|
| 1 | "TAKE OUT COMPONENT A" | "NORMAL" | "NORMAL" | | | |
| 2 | "ASSEMBLE COMPONENT A" | "NORMAL" | "NORMAL" | | | |
| 3 | "TAKE OUT COMPONENT B" | "NORMAL" | "NORMAL" | | | |
| 4 | "ASSEMBLE COMPONENT B" | "ABNORMAL" | "NORMAL" | | | |
| 5 | "TAKE OUT COMPONENT C" | "NORMAL" | "NORMAL" | 1 | 16.4 | {"SCREW COMPONENT C"} |
| 6 | "ASSEMBLE COMPONENT C" | "NORMAL" | "NORMAL" | | | |
| 7 | "TAKE OUT COMPONENT D" | "NORMAL" | "NORMAL" | | | |
| 8 | NA | "NORMAL" | "ABNORMAL" | | | |
| 9 | "ASSEMBLE COMPONENT D" | "NORMAL" | "NORMAL" | | | |
| 10 | "PUT FINISHED PRODUCT IN BOX" | "NORMAL" | "NORMAL" | | | |
| 11 | "ASSEMBLE COMPONENT A" | "NORMAL" | "NORMAL" | 2 | 2.6 | {"TAKE OUT COMPONENT A"} |
| 12 | "TAKE OUT COMPONENT B" | "NORMAL" | "NORMAL" | | | |

WORK SUPPORT DEVICE AND WORK SUPPORT METHOD

CROSS-REFERENCE TO RELATED APPLICATION

The present application is based on PCT filing PCT/JP2020/023983, filed Jun. 18, 2020, the entire contents of which are incorporated herein by reference.

FIELD

The present disclosure relates to a work support device and a work support method that support work of a working entity.

BACKGROUND

Work performed at a manufacturing site of a product or the like may involve an error such as omission of attachment of a part or mix-up of parts. A known technique for responding to such an error gives an instruction to redo the work by detecting the error in the work, or presents a video related to correct work for understanding of the work.

For example, a work support device of Patent Literature 1 sets, within an imaging range of an imaging unit, a monitoring area indicating a range in which work is monitored in accordance with a position where each work is performed. The work support device of Patent Literature 1 detects a dynamic state in the monitoring area by comparing a portion corresponding to the monitoring area in a measured image with a portion corresponding to the monitoring area in another image measured at a point of time before the measured image. The work support device of Patent Literature 1 reports "normal" in a case where a dynamic state can be detected within a specific time, or reports "abnormal" in a case where a dynamic state cannot be detected.

CITATION LIST

Patent Literature

Patent Literature 1: Japanese Patent Application Laid-open No. 2018-156279

SUMMARY

Technical Problem

However, the technique of Patent Literature 1 may result in false detection at the time of detecting a dynamic state. For example, it is assumed that the work support device of Patent Literature 1 is to detect a dynamic state of a hand of a working entity. In a case where the working entity extends the hand to a wrong position on a path passing through the monitoring area, the work support device of Patent Literature 1 detects the dynamic state of the hand of the working entity, and thus reports "normal" even though the hand is extended to the wrong position. The work support device of Patent Literature 1 thus has had a problem of performing false work support.

The present disclosure has been made in view of the above, and an object thereof is to provide a work support device capable of executing accurate work support.

Solution to Problem

In order to solve the above problem and achieve the object, the present disclosure is a work support device that supports work including a series of a plurality of operations to be performed by a working entity, the work support device including a sensor data input device that receives a sensor data string in which sensor data obtained by measuring work of the working entity is arranged in order of acquisition. The work support device further includes: a class data calculator that calculates a class data string indicating sections, which are obtained by dividing the sensor data string, by comparing the sensor data string with a template that is set for each of classes as a type of temporal change of the sensor data and is a set including a probability distribution of the sensor data at each time; and a reliability calculator that calculates reliability of the sections for each section on the basis of information on the sections indicated by the class data string. The work support device further includes: a reliability determiner that determines whether or not the reliability satisfies a criterion and generates, as first support information, information on an operation included in the section in which the reliability satisfies the criterion among the sections; and a report device that reports the first support information.

Advantageous Effects of Invention

The work support device according to the present disclosure has an effect of being able to execute accurate work support.

BRIEF DESCRIPTION OF DRAWINGS

FIG. 4 is a set of tables for explaining a data structure of sensor data strings stored in a sensor data storage device included in the work support device according to the first embodiment.

FIG. 6 is a table for explaining a data structure of standard data stored in a work information storage device included in the work support device according to the first embodiment.

FIG. 7 is a table for explaining a data structure of operation name data stored in the work information storage device included in the work support device according to the first embodiment.

FIG. 9 is a table for explaining a data structure of first templates stored in the work information storage device included in the work support device according to the first embodiment.

FIG. 11 is a table for explaining a data structure of first class transition probabilities stored in the work information storage device included in the work support device according to the first embodiment.

FIG. 12 is a set of tables for explaining a data structure of a class data string generated by a class data calculator included in the work support device according to the first embodiment.

FIG. 14 is a set of tables for explaining a data structure of procedure data values generated by a standard data specifier included in the work support device according to the first embodiment.

FIG. 15 is a set of tables for explaining a data structure of section evaluation values calculated by a section evaluator included in the work support device according to the first embodiment.

FIG. 16 is a set of tables for explaining a data structure of reliabilities calculated by a reliability calculator included in the work support device according to the first embodiment.

FIG. 17 is a set of tables for explaining a data structure of determination results of reliability determined by a reliability determiner included in the work support device according to the first embodiment.

FIG. 20 is a table for explaining a data structure of performance data stored in the work performance storage device included in the work support device according to the first embodiment.

FIG. 26 is a table for explaining a data structure of performance data stored in the work performance storage device included in the work support device according to the second embodiment.

FIG. 27 is a table for explaining a data structure of detection result data detected by a cycle evaluator included in the work support device according to the second embodiment.

FIG. 28 is a diagram schematically illustrating a mode of first support information displayed on the display device by the work support device according to the second embodiment.

DESCRIPTION OF EMBODIMENTS

A work support device and a work support method according to embodiments of the present disclosure will now be described in detail with reference to the drawings.

First Embodiment

Figure 1:
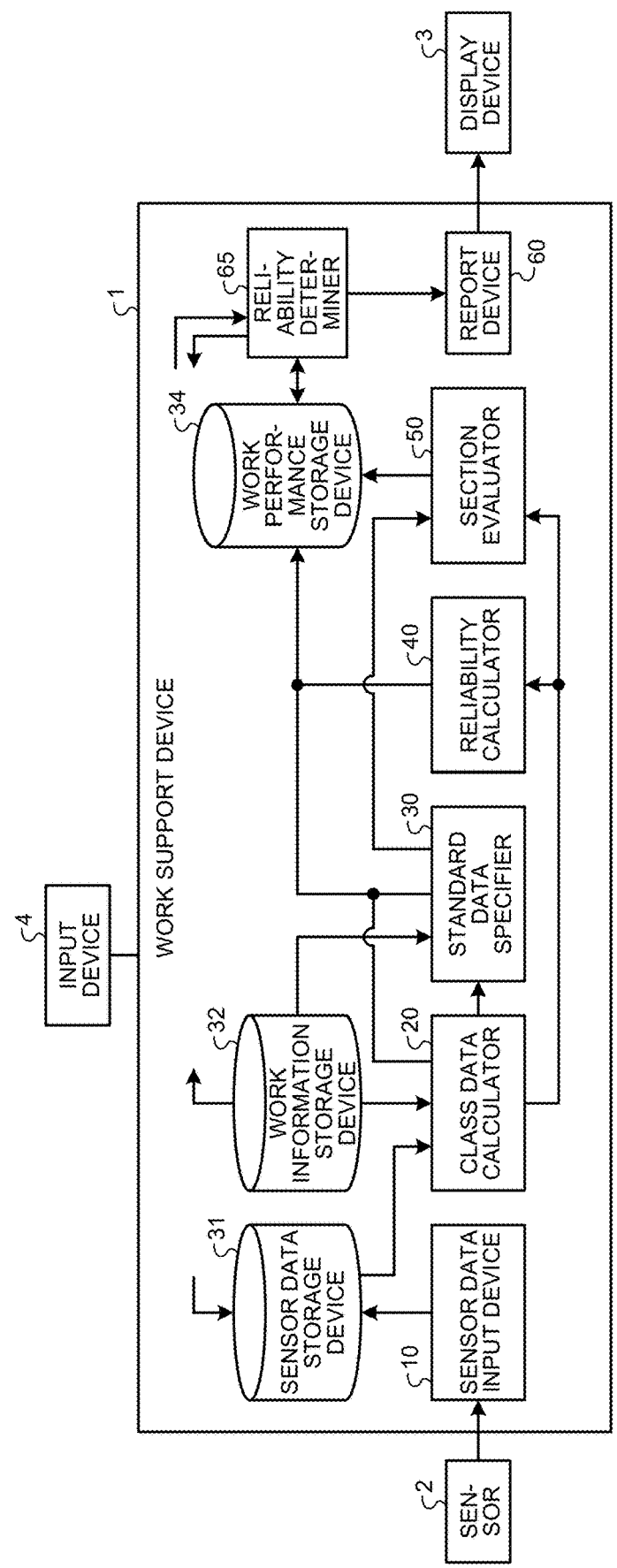
FIG. 1 is a diagram illustrating an example of a configuration of a work support device according to a first embodiment.

FIG. 1 is a diagram illustrating an example of a configuration of a work support device according to a first embodiment. A work support device 1 is a computer that analyzes work performed by a specific working entity and executes work support.

In the first embodiment, the working entity may be one or a plurality of persons, one or a plurality of machines, or a combination thereof. The first embodiment will describe a case where the working entity is one person. The work support device 1 is installed on some terminal device in a factory or the like together with a sensor 2, a display device 3, and an input device 4, for example.

The sensor 2, the display device 3, and the input device 4 are connected to the work support device 1. The work support device 1 evaluates work using data measured by the sensor 2 (hereinafter referred to as sensor data), generates support information indicating work support on the basis of an evaluation value, and reports the support information.

The work support device 1 includes a sensor data input device 10, a sensor data storage device 31, a work information storage device 32, a class data calculator 20, a standard data specifier 30, a reliability calculator 40, a work performance storage device 34, a section evaluator 50, a reliability determiner 65, and a report device 60.

The sensor data input device 10 acquires sensor data in time series output from the sensor 2, and stores the sensor data in the sensor data storage device 31 as a sensor data string "x". The sensor data storage device 31 stores the sensor data string "x" in which the sensor data is arranged in order of acquisition thereof.

The work information storage device 32 stores standard data designed in advance for each of a series of a plurality of operations included in cycle work. The standard data will be described later. The work information storage device 32 also stores a name of the operation included in the cycle work (operation name data to be described later) and a video of the operation included in the cycle work (first reference video data to be described later).

Moreover, the work information storage device 32 stores a template designed in advance for each class that is a type of the operation. The class is a type of temporal change in the sensor data acquired for each of the series of the plurality of operations included in the cycle work. The template includes a mean of a Gaussian distribution and a variance of the Gaussian distribution of the sensor data. That is, the template is set for each class that is the type of temporal change in the sensor data, and is a set including a probability distribution of the sensor data at each time. Details of the template will be described later.

Moreover, the work information storage device 32 stores a first class transition probability designed in advance. The first class transition probability indicates a probability that the working entity performs the operation corresponding to a first class of the classes and then performs the operation corresponding to a second class of the classes. That is, the first class transition probability indicates a probability of transition from a specific class to a specific class.

The class data calculator 20 calculates a class data string "s" on the basis of the sensor data string "x" stored in the sensor data storage device 31 and the template stored in the work information storage device 32. The class data string "s" is a data string indicating a section and a class number of the sensor data string "x". The class data calculator 20 calculates the class data string "s" by dividing the sensor data string "x" into a plurality of sections and classifying the time-series sensor data in each of the divided sections into any one of a plurality of the classes. The class data calculator 20 transmits the class data string "s" to the standard data specifier 30, the reliability calculator 40, and the section evaluator 50. The class data calculator 20 also generates a time-series graph representing the class data string "s" in time series, and stores the time-series graph in the work performance storage device 34. The time-series graph will be described later.

The standard data specifier 30 generates a procedure data value, which is a value indicating the standard data corresponding to each section, for each section obtained by dividing the sensor data string "x", that is, each section indicated by the class data string "s". That is, the standard data specifier 30 generates the procedure data value of each section by setting the standard data for each section. The standard data specifier 30 generates the procedure data value on the basis of the standard data stored in the work information storage device 32 and the class data string "s" transmitted from the class data calculator 20. The standard data specifier 30 transmits the procedure data value to the section evaluator 50. Moreover, the standard data specifier 30 stores the procedure data value in the work performance storage device 34.

The section evaluator 50 compares the class data string "s" with the standard data in the procedure data value to calculate a section evaluation value that is a value obtained by evaluating each section obtained by dividing the sensor data string "x". The section evaluator 50 stores the section evaluation value in the work performance storage device 34.

The reliability calculator 40 calculates reliability $R_m$ for each section indicated by the class data string "s" calculated by the class data calculator 20. The reliability $R_m$ is the reliability of each section and each class number calculated. The reliability calculator 40 generates a performance sensor data string in which sensor data included in a section in which the reliability $R_m$ satisfies a criterion is arranged in order of acquisition, and stores the performance sensor data string in the work performance storage device 34.

The work performance storage device 34 stores the procedure data value, the section evaluation value, and the performance sensor data string. The work performance storage device 34 also stores performance data such as a performance class data string, a performance procedure data value, and a performance section evaluation value which will be described later.

The reliability determiner 65 outputs, to the report device 60, information related to the operation included in the section in which the reliability $R_m$ satisfies the criterion (first support information to be described later) and information on only the operation included in the latest section (second support information to be described later). The reliability determiner 65 generates at least one of the first support information and the second support information using the operation name data, the first reference video data, and the like stored in the work information storage device 32, and outputs the generated support information to the report device 60.

Also, in a case where the reliability $R_m$ satisfies the criterion, the reliability determiner 65 removes, from the sensor data string "x", the sensor data included in the section in which the reliability $R_m$ satisfies the criterion, and updates the sensor data string "x". The reliability determiner 65 further updates the performance data indicating performance of the work for the section in which the reliability $R_m$ satisfies the criterion. The reliability determiner 65 updates the sensor data string "x" for the sensor data storage device 31, and updates the performance data for the work performance storage device 34.

The report device 60 outputs the first support information and the second support information generated by the reliability determiner 65 to the display device 3.

Figure 2:
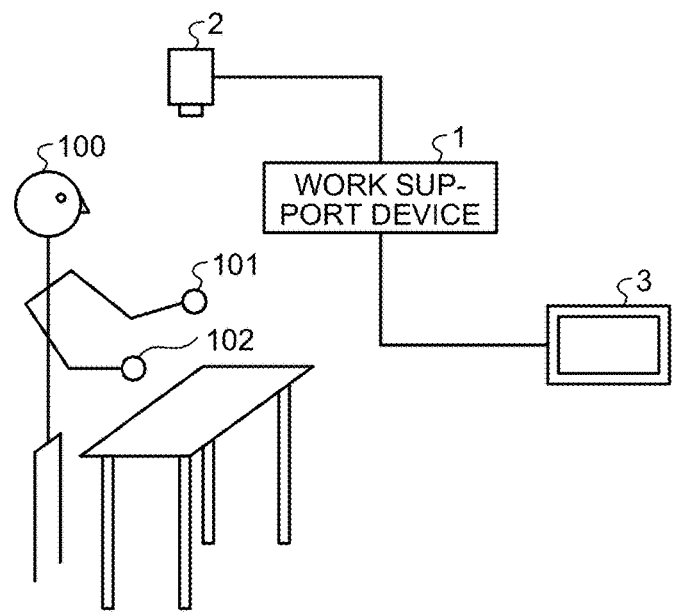
FIG. 2 is a diagram for explaining an example of use of the work support device according to the first embodiment.

FIG. 2 is a diagram for explaining an example of use of the work support device according to the first embodiment. In the first embodiment, a working entity 100 repeatedly performs the cycle work, which is work including the series of the plurality of operations, for a plurality of times.

(Sensor 2)

The sensor 2 outputs the sensor data detected by measuring the work to the work support device 1. The sensor 2 is, for example, a depth sensor, and is disposed so as to be able to image work done by a left hand 101 and a right hand 102 of the working entity 100. The sensor 2 includes, for example, a light source that emits infrared light in a specific pattern and an imaging element that receives infrared light reflected by an object such as the left hand 101 and the right hand 102 being the target of detection, and generates depth image data indicating a depth to the object as a pixel value. Furthermore, the sensor 2 detects height positions of the left hand 101 and the right hand 102 of the working entity 100 from the depth image data, and outputs these height positions as the sensor data every 200 milliseconds, for example. Note that a specific example of the depth sensor is an existing depth sensor such as Kinect (registered trademark). The processing of detecting the positions of the left hand 101 and the right hand 102 from the depth image data can be achieved by existing processing used in the depth sensor.

The work support device 1 acquires the sensor data from the sensor 2 and generates the support information indicating work support on the basis of the sensor data. The work support device 1 reports the support information to the working entity 100 by displaying the support information on the display device 3.

Figure 3:
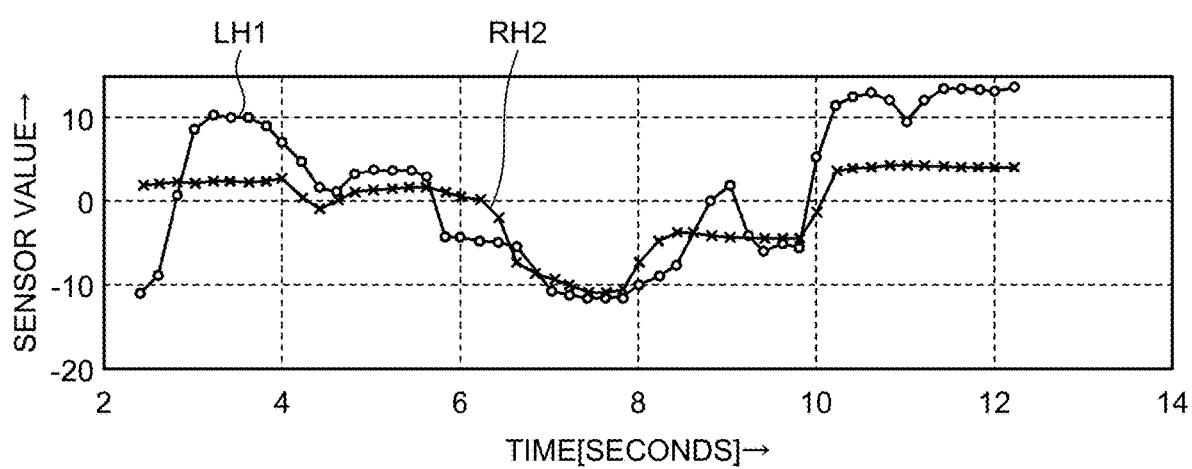
FIG. 3 is a graph illustrating an example of sensor data output by a sensor according to the first embodiment.

FIG. 3 is a graph illustrating an example of the sensor data output by the sensor according to the first embodiment. In FIG. 3, a horizontal axis represents time when the sensor data is acquired, and a vertical axis represents a sensor value being a value of the sensor data, that is, coordinate values of the height positions of the left hand 101 and the right hand 102 represented by the sensor data. In FIG. 3, the coordinate value of the height position of the left hand 101 is indicated by a coordinate value LH1, and the coordinate value of the height position of the right hand 102 is indicated by a coordinate value RH2.

In the first embodiment, the sensor data is the height positions of the left hand 101 and the right hand 102 of the working entity 100, and thus has two-dimensional values.

Note that the first embodiment describes a case where the depth sensor is used as the sensor 2, but the present disclosure is not limited to the use of the depth sensor and may use any device that can measure the work of the working entity 100 and generate the sensor data. As the device other than the depth sensor, for example, a video camera, a three-dimensional acceleration sensor, a three-dimensional angular velocity sensor, or the like can be used. Moreover, in the first embodiment, the positions of the left hand 101 and the right hand 102 of the working entity 100 are set as the target of detection by the sensor 2, but the target of detection is not limited thereto. The sensor 2 may set, as the target of detection, a head position or angles of a plurality of joints in the body of the working entity 100, or biological information of the working entity 100. Examples of the biological information of the working entity 100 are heart rate and respiration.

(Operation of Each Component)

Next, the operation of each component of the work support device 1 will be described.

(Sensor Data Input Device 10)

The sensor data input device 10 acquires the sensor data output in time series from the sensor 2, and adds the sensor data to the tail of the sensor data string "x" stored in the sensor data storage device 31. In the first embodiment, every time five pieces of the sensor data are output by the sensor 2, the sensor data input device 10 adds the five pieces of the sensor data to the tail of the sensor data string "x" stored in the sensor data storage device 31. Since the sensor 2 outputs the sensor data every 200 milliseconds in the first embodiment, the sensor data input device 10 adds the five pieces of the sensor data every second to the tail of the sensor data string "x".

(Sensor Data Storage Device 31)

The sensor data storage device 31 stores the sensor data string "x" in which the sensor data is arranged in order of acquisition thereof. In the first embodiment, the sensor data string "x" includes x={x (1), x (2), . . . , x (N)}. Here, "x (n)" is the sensor data acquired in an n-th place in the sensor data string "x". Also, "N" is the number of pieces of the sensor data included in the sensor data string "x". Moreover, "N" is a positive integer, and "n" is a positive integer from one to "N".

FIG. 4 is a set of tables for explaining a data structure of sensor data strings stored in the sensor data storage device included in the work support device according to the first embodiment. Since the sensor data is a two-dimensional value in the first embodiment, the sensor data storage device 31 stores the sensor data string "x (n)" as two values. Sensor data strings SD1 to SD4 represent structures of the sensor data strings "x" acquired one second, two seconds, three seconds, and four seconds after the start of the operation, respectively.

In the first embodiment, since the sensor 2 outputs the sensor data every 200 milliseconds, the number of pieces of the sensor data "N" is five, ten, fifteen, and twenty in the sensor data strings SD1 to SD4, respectively. That is, the sensor data string SD1 includes sensor data strings x (1) to x (5), and the sensor data string SD2 includes sensor data strings x (1) to x (10). The sensor data string SD3 includes sensor data strings x (1) to x (15), and the sensor data string SD4 includes sensor data strings x (1) to x (20).

The sensor data string SD2 is generated by adding, to the tail of the sensor data string SD1, the sensor data strings x (6) to x (10) acquired from one second after to two seconds after the start of the operation. The sensor data string SD3 is generated by adding, to the tail of the sensor data string SD2, the sensor data strings x (11) to x (15) acquired from two seconds after to three seconds after the start of the operation. The sensor data string SD4 is generated by adding, to the tail of the sensor data string SD3, the sensor data strings x (16) to x (20) acquired from three seconds after to four seconds after the start of the operation.

Figure 5:
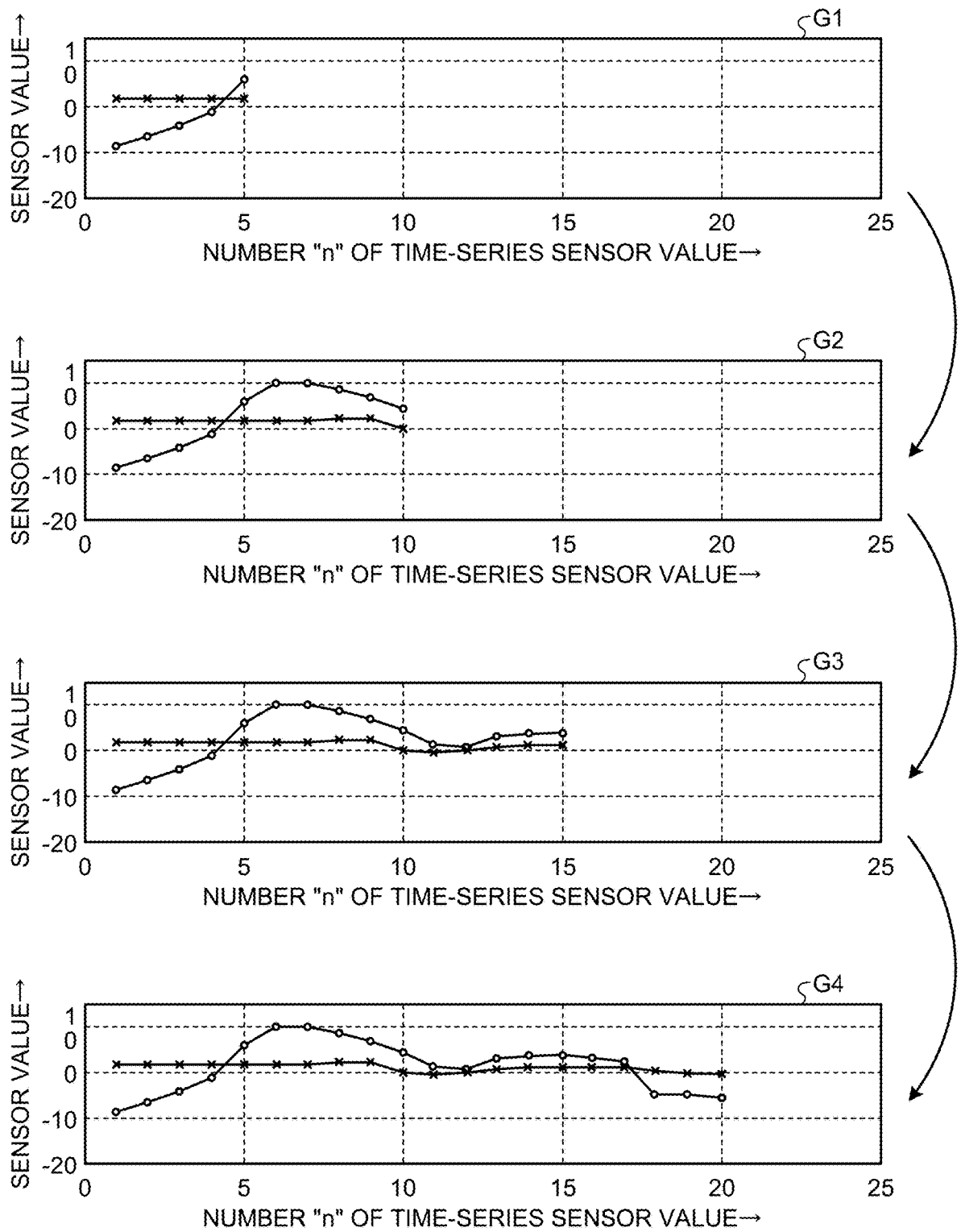
FIG. 5 is a set of graphs illustrating, in the form of time-series graphs, the sensor data strings illustrated in FIG. 4.

FIG. 5 is a set of graphs illustrating, in the form of time-series graphs, the sensor data strings illustrated in FIG. 4. In FIG. 5, a horizontal axis represents the number "n" corresponding to the sensor data output in time series in the sensor data string "x", and a vertical axis represents the sensor value of the sensor data. A time-series graph G1 corresponds to the sensor data string SD1, and a time-series graph G2 corresponds to the sensor data string SD2. A time-series graph G3 corresponds to the sensor data string SD3, and a time-series graph G4 corresponds to the sensor data string SD4.

The sensor data input device 10 generates the time-series graph G1 on the basis of the sensor data string SD1, and generates the time-series graph G2 on the basis of the sensor data string SD2. The sensor data input device 10 generates the time-series graph G3 on the basis of the sensor data string SD3, and generates the time-series graph G4 on the basis of the sensor data string SD4. The sensor data input device 10 stores the time-series graphs G1 to G4 in the sensor data storage device 31.

(Work Information Storage Device 32)

Next, the work information storage device 32 according to the first embodiment will be described.

(Work Information Storage Device 32: Standard Data String)

The work information storage device 32 stores a standard data string STD designed in advance for each of the series of the plurality of operations included in the cycle work. The standard data string STD includes STD={STD (1), STD (2), . . . , STD (F)}. Here, "STD (f)" is the standard data designed in advance for an f-th operation included in the cycle work. Also, "f" is a number for identifying each of a plurality of pieces of the standard data, and is a positive integer from one to "F". Moreover, "f" indicates the order of each of the series of the plurality of operations included in the cycle work. Furthermore, "F" is the number of pieces of the standard data included in the cycle work, and is the number of operations designed in advance.

In the first embodiment, the standard data string STD (f) includes a temporal length of the operation and a class, which is a type of the operation, that are designed in advance for the f-th operation included in the cycle work.

The standard data string includes STD (f)={STDb (f), STDc (f)}. Here, "STDb (f)" is a standard length indicating the length of time designed in advance for the f-th operation included in the cycle work. Moreover, "STDc (f)" is a standard class number indicating a class number of the class designed in advance for the f-th operation included in the cycle work.

FIG. 6 is a table for explaining a data structure of the standard data stored in the work information storage device included in the work support device according to the first embodiment. FIG. 6 illustrates an example of the standard data string STD (f) where the cycle work includes F=10, or ten operations. The standard data string STD (f) includes "STDb (f)" and "STDc (f)".

In FIG. 6, "STDG (f)" representing the standard class number has a value matching the value of "f", but does not necessarily have to have the value matching the value of "f". The standard data string STD (f) may also include a plurality of pieces of the standard data having the same standard class number. That is, the same operation may be performed a plurality of times in the cycle work.

(Work Information Storage Device 32: Operation Name Data)

The work information storage device 32 according to the first embodiment further stores operation name data LABEL (f) that is a name of the f-th operation included in the cycle work. Here, "f" is also the number for identifying each of the plurality of pieces of the standard data, and is an integer from one to "F". Also, "F" is the number of pieces of the standard data described above.

FIG. 7 is a table for explaining a data structure of the operation name data stored in the work information storage device included in the work support device according to the first embodiment. As with FIG. 6, FIG. 7 illustrates an example of the operation name data LABEL (f) where the working entity 100 performs F=10, or ten operations.

(Work Information Storage Device 32: First Reference Video Data)

The work information storage device 32 according to the first embodiment further stores first reference video data REF (f) that is a video indicating the f-th operation included in the cycle work. Here, "f" is also the number for identifying each of the series of the plurality of operations performed by the working entity 100, and is an integer from one to "F". Also, "F" is the number of pieces of the standard data described above.

Figure 8:
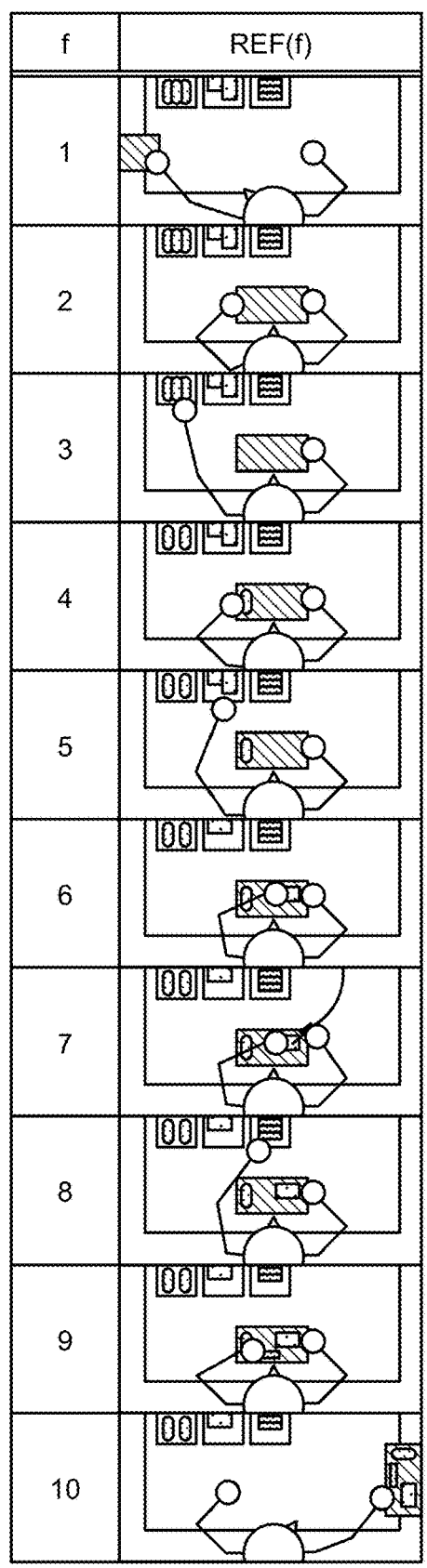
FIG. 8 is a table for explaining a data structure of first reference video data stored in the work information storage device included in the work support device according to the first embodiment.

FIG. 8 is a table for explaining a data structure of the first reference video data stored in the work information storage device included in the work support device according to the first embodiment. As with FIG. 6, FIG. 8 illustrates an example of the first reference video data REF (f) where the cycle work includes F=10, or ten operations. That is, the first reference video data REF (f) here includes ten pieces of video data corresponding in number to the number of operations.

(Work Information Storage Device 32: First Template)

The work information storage device 32 further stores a first template $g_j$ designed in advance for each of the above classes. Here, "j" is a number for identifying each of the plurality of classes, and is a positive integer from one to "J". Moreover, "J" is the number of the classes described above, that is, the number of the first templates $g_j$.

In the first embodiment, the first templates $g_j$ are a set including a Gaussian distribution of the sensor data at each time. In this case, the first template $g_j$ can be designed as a parameter of the Gaussian distribution of the sensor data acquired for the operation corresponding to the class "j". The first template includes $g_j=\{g_j(1), g_j(2), \ldots, g_j(L)\}$. Here, "$g_j(i)$" is a parameter of the Gaussian distribution of i-th ("i" is a positive integer from one to "L") sensor data acquired for the operation corresponding to the class "j", and $g_j(i)=\{\mu_j(i), \sigma_j^2(i)\}$. Here, "$\mu_j(i)$" is a mean of the Gaussian distribution, and "$\sigma_j^2(i)$" is a variance of the Gaussian distribution. Moreover, "L" is the length of the first template $g_j$, that is, represents a maximum value of the number of pieces of the sensor data acquired for each operation.

The first template $g_j$ according to the first embodiment will be described more specifically. As described above, "$\mu_j(i)$" is the mean of the Gaussian distribution of the i-th sensor data acquired for the operation corresponding to the class "j". As with the sensor data, "$\mu_j(i)$" has a two-dimensional value. Also, "$\sigma_j^2(i)$" is the variance of the Gaussian distribution of the i-th sensor data acquired for the operation corresponding to the class "j". In the first embodiment, it is assumed that the variance of the Gaussian distribution of the sensor data is similar in any dimension. Therefore, "$\sigma_j^2(i)$" is a one-dimensional value.

FIG. 9 is a table for explaining a data structure of the first templates stored in the work information storage device included in the work support device according to the first embodiment. The first template $g_j(i)$ includes "$\mu_j(i)$" and "$\sigma_j^2(i)$". In an example of the first template $g_j(i)$ of FIG. 9, the number of classes is J=10, or ten. As described above, "j" is the number for identifying the class. Also, in the example of FIG. 9, the first template $g_j(i)$ has a length of L=20.

Figure 10:
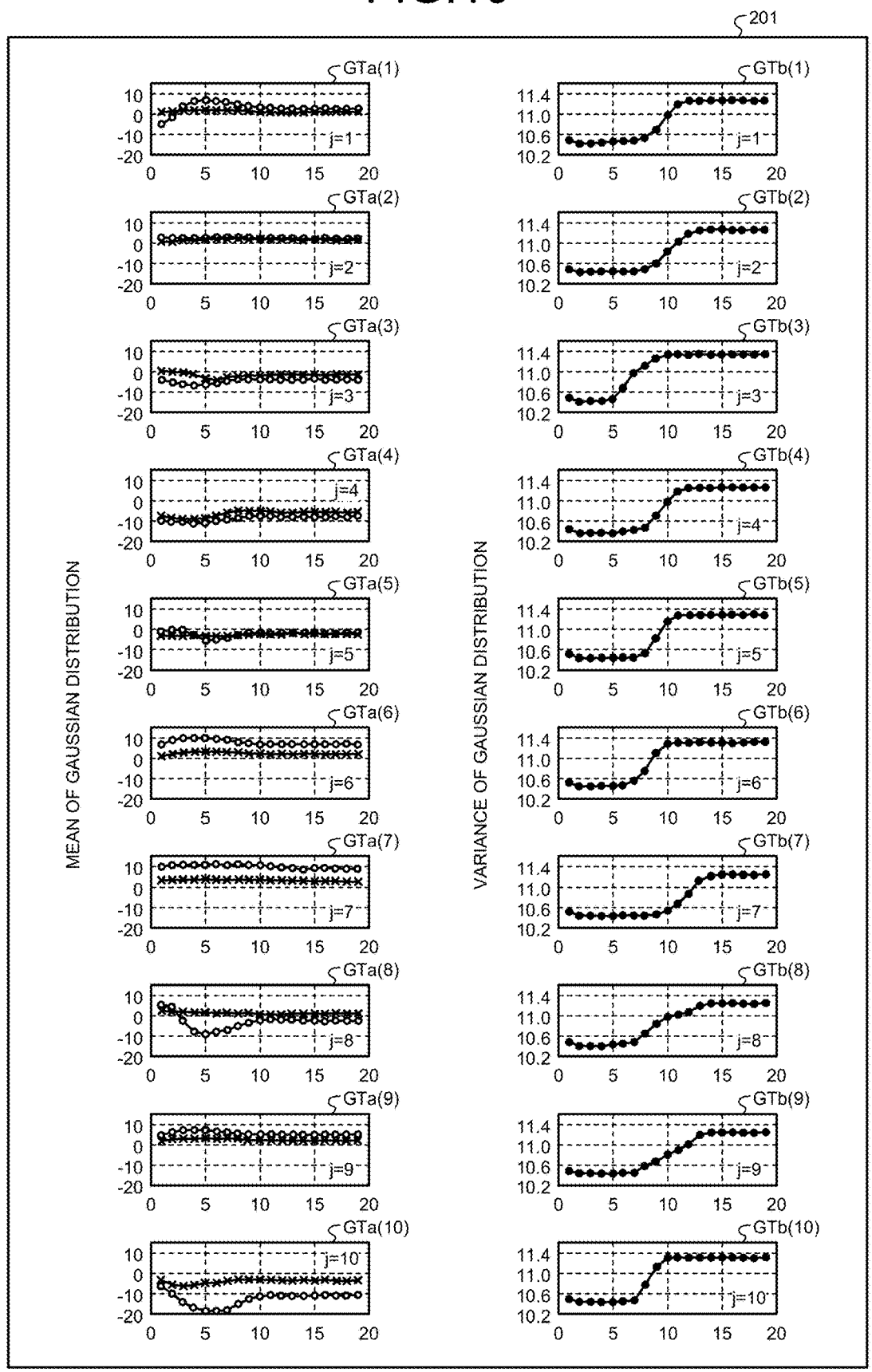
FIG. 10 is a graph illustrating, in the form of time-series graphs, the first templates illustrated in FIG. 9.

FIG. 10 is a graph illustrating, in the form of time-series graphs, the first templates illustrated in FIG. 9. A time-series graph 201 includes the first template $g_j$ corresponding to each class "j". That is, the time-series graph 201 includes first templates $g_{1\ to\ 10}$ corresponding to the classes "j". FIG. 10 illustrates the first template $g_j$ of the class "j" by time-series graphs GTa (j) and GTb (j). The time-series graph GTa (j) is a time-series graph of "$\mu_j(i)$", and the time-series graph GTb (j) is a time-series graph of "$\sigma_j^2(i)$". The time-series graph 201 includes time-series graphs GTa (1) and GTb (1) to GTa (10) and GTb (10) as the first templates $g_{1\ to\ 10}$ of first to tenth classes.

In each of the time-series graphs GTa (j) and GTb (j), a horizontal axis represents the number "i" of the sensor data acquired for the operation corresponding to each class "j". A vertical axis of the time-series graph GTa (j) represents the mean, that is, "$\mu_j(i)$" of the Gaussian distribution of the sensor data acquired for the operation corresponding to each class "j". A vertical axis of the time-series graph GTb (j) represents the variance, that is, "$\sigma_j^2(i)$" of the Gaussian distribution of the sensor data acquired for the operation corresponding to each class "j".

As described above, the mean of the Gaussian distribution is a two-dimensional value as with the sensor data. Also, it is assumed that the variance of the Gaussian distribution is similar in any dimension. Therefore, the variance of the Gaussian distribution is a one-dimensional value.

(Work Information Storage Device 32: First Class Transition Probability)

The work information storage device 32 according to the first embodiment further stores a first class transition probability P (j|j') designed in advance. Here, "j" and "j'" are each a number for identifying each of the plurality of classes. Also, "P (j|j')" indicates a probability that the working entity 100 performs the operation corresponding to the class "j'" and then performs the operation corresponding to the class "j".

FIG. 11 is a table for explaining a data structure of the first class transition probabilities stored in the work information storage device included in the work support device according to the first embodiment. As described above, "j" and "j'" are each the number for identifying the class. FIG. 11 illustrates values of the first class transition probability P (j|j') for combinations of j=1 to 10 and j'=1 to 10.

(Class Data Calculator 20)

Next, the class data calculator 20 according to the first embodiment will be described. The class data calculator 20 calculates the class data string "s" on the basis of the sensor data string "x" stored in the sensor data storage device 31 and each template $g_j$ stored in the work information storage device 32.

Specifically, the class data calculator 20 determines a plurality of sections obtained by temporally dividing the sensor data string "x", and a class of each section indicating a type of temporal change of the sensor data included in each section.

The class data calculator 20 further generates, for the sensor data string "x", the class data string "s" indicating each section and each class number of the sensor data string "x". The class data string "s" includes $s=\{s_1, s_2, \ldots, s_m, \ldots, s_M\}$. Here, "M" ("M" is a positive integer) is the number of sections included in the class data string "s", that is, the number of sections obtained by dividing the sensor data string "x".

Also, "m" is a number for identifying each of the plurality of sections obtained by dividing the sensor data string "x", and is an integer from one to "M". The integer "M" corresponds to a number indicating the latest section among the sections obtained by dividing the sensor data string "x".

The integer "m" corresponds to the order of each of the plurality of sections in the sensor data string "x".

Moreover, "$s_m$" is an element of the class data string "s" in an m-th section obtained by dividing the sensor data string "x", and $s_m=\{a_m, b_m, c_m\}$. Here, "$a_m$" is a start number of the m-th section obtained by dividing the sensor data string "x", "$b_m$" is a length of the m-th section obtained by dividing the sensor data string "x", and "$c_m$" is a class number by which the m-th section obtained by dividing the sensor data string "x" is classified. The class data calculator 20 uses the class data string $s_m=\{a_m, b_m, c_m\}$ to be able to express, for example, time-series sensor data $x_m$ included in the m-th section obtained by dividing the sensor data string "x" as $x_m=\{x(a_m), x(a_{m+1}), \ldots, x(a_m+b_m-1)\}$.

In the first embodiment, the work support device 1 uses Forward Filtering-Backward Sampling (FF-BS) to divide the sensor data string "x" into the plurality of sections and classify the time-series sensor data in each of the divided sections into any one of the plurality of classes. The FF-BS includes two steps of probability calculation related to an FF step, and division and classification related to a BS step.

(Class Data Calculator 20: FF Step)

First, the FF step will be described. In the FF step, the class data calculator 20 uses the following expression (1) to calculate, as a Gaussian distribution "Normal", a probability $P(x(n)|X_j, I_j)$ that the n-th sensor data string x (n) in the sensor data string "x" is generated from the i-th Gaussian distribution of the first template $g_j$ (i) corresponding to the class "j".

Also, when the n-th section is to be further obtained by division from the sensor data string "x" from which the first to (n−i)-th sections have already been obtained by division, the class data calculator 20 uses the following expression (2) to calculate a probability α [n] [i] [j] that the class of the n-th section is "j". Here, "P (j|j')" is the first class transition probability described above. Expression (2) is a recurrence formula, and the class data calculator 20 can calculate the probability α[n] [i] [j] in order from n=1 to n=N.

[Expression 1]

$$P(x(n)|X_j,I_j) \propto \text{Normal}(\mu_j(i), \sigma_j^2(i)) \quad (1)$$

[Expression 2]

$$\alpha[n][i][j] = P(x(n-1), x(n-1+1), \ldots, x(n)|X_j, I_j) \times \sum_{i'=1}^{L} \sum_{j'=1}^{J} P(j|j') \alpha[n-1][i'][j'] \quad (2)$$

(Class Data Calculator 20: BS Step)

Next, the BS step will be described. In the BS step, for the section obtained by dividing the sensor data string "x", the class data calculator 20 samples the class data using the following expression (3). In expression (3), "$b_{m'}$" and "$c_{m'}$" in the first row are random variables obtained from a probability distribution on the right side, and the second row is a recurrence formula of a variable "$a_{m'}$".

[Expression 3]

$$\begin{cases} b_{m'}, c_{m'} \sim \alpha[N - a_{m'-1}][b_{m'}][c_{m'}] \\ a_{m'} = N - a_{m'-1} - b_{m'} + 1 \end{cases} \quad (3)$$

According to expression (3), the class data calculator 20 can generate class data $s_m = \{a_{m'}, b_{m'}, c_{m'}\}$ in order from m'=1 to m'=M. Here, "M" is the number of sections obtained by dividing the sensor data string "x" using expression (3). Moreover, "$s_{m'}$" is the class data in an m'-th section from the tail obtained by dividing the sensor data string "x". In expression (3), the class data in the section obtained by dividing the sensor data string "x" is calculated in order from the tail of the sensor data string "x". That is, the class data string $s_m = \{a_m, b_m, c_m\} = \{a_{M-m'+1}, b_{M-m'+1}, c_{M-m'+1}\}$ in the m-th section from the front obtained by dividing the sensor data string "x" is calculated.

FIG. 12 is a set of tables for explaining a data structure of the class data string generated by the class data calculator included in the work support device according to the first embodiment. FIG. 12 illustrates a class data string 202 generated on the basis of the plurality of first templates $g_j$ from the sensor data strings "x" illustrated in FIG. 4. Moreover, the number of classes is J=10.

The class data string 202 includes class data CD1 to CD4 as the class data strings $s_m$ corresponding to the sensor data strings SD1 to SD4. The class data CD1 and CD2 both include the class data $s_1$. The class data CD3 includes the class data $s_1$ and $s_2$. The class data CD4 includes the class data $s_1$, $s_2$, and $s_3$.

Figure 13:
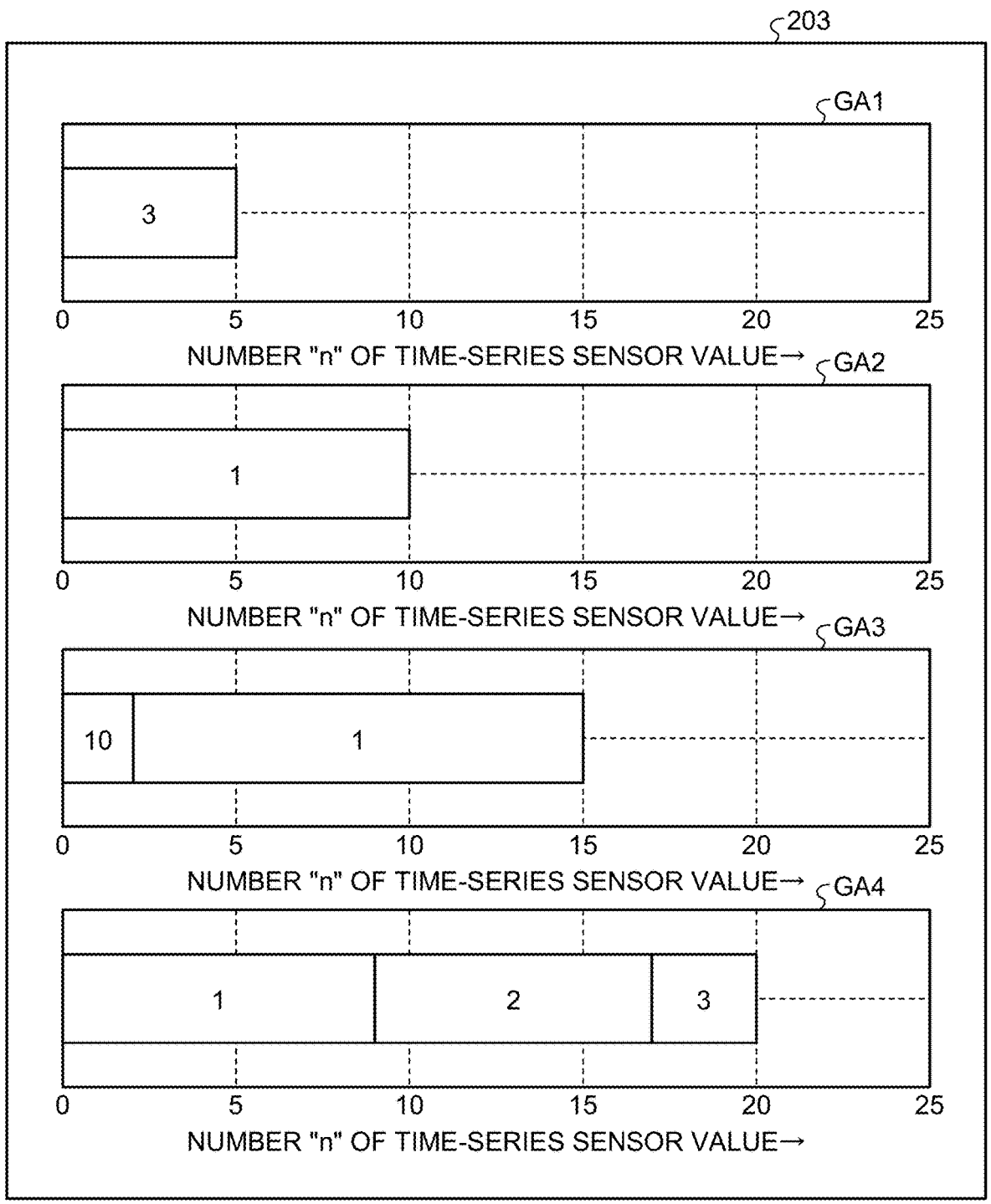
FIG. 13 is a graph illustrating, in the form of time-series graphs, the class data string illustrated in FIG. 12.

FIG. 13 is a graph illustrating, in the form of time-series graphs, the class data string illustrated in FIG. 12. A time-series graph 203 includes time-series graphs GA1 to GA4 corresponding to the class data CD1 to CD4. In FIG. 13, as in FIG. 5, a horizontal axis represents the number "n" corresponding to the sensor data output in time series in the sensor data string "x".

The class data calculator 20 generates the time-series graph GA1 on the basis of the class data CD1, and generates the time-series graph GA2 on the basis of the class data CD2. Also, the class data calculator 20 generates the time-series graph GA3 on the basis of the class data CD3, and generates the time-series graph GA4 on the basis of the class data CD4. The class data calculator 20 stores the time-series graphs GA1 to GA4 generated in the work performance storage device 34.

Each rectangle including any of numbers "1" to "10" represents each section [$a_m$, $a_m+b_m-1$] obtained by dividing the sensor data string "x". Moreover, the numbers "1" to "10" written in the sections each represent the class number $c_m$ for classifying each section. For example, in the time-series graph GA4, the section of m=1 has $a_m=1$, $a_m+b_m-1=9$, and $c_m=1$. Moreover, the section of m=2 has $a_m=10$, $a_m+b_m-1=17$, and $c_m=2$, and the section of m=3 has $a_m=18$, $a_m+b_m-1=20$, and $c_m=3$.

(Class Data Calculator 20: Grounds for Immediacy)

Typically, right after the working entity 100 starts each operation of the cycle work included in the series of operations, the number of points of the sensor data acquired for the operation is small, so that the accuracy regarding estimation of the class number $c_m$ tends to be reduced.

However, even right after the working entity 100 starts each operation included in the cycle work, the class data calculator 20 can accurately estimate the section and the class number $c_m$ corresponding to each operation. That is, the class data calculator 20 stochastically samples and estimates each section obtained by dividing the sensor data string "x", and thus can estimate that the operation performed by the working entity 100 has changed from a previous operation to the operation being performed. Furthermore, although the number of points of the sensor data that can be acquired for the operation is small, the class data calculator 20 uses the first class transition probability to be able to estimate the class number $c_m$ of the section corresponding to the operation in consideration of the class number $c_m$ of the section corresponding to the previous operation preceding the operation.

(Standard Data Specifier 30)

Next, the standard data specifier 30 according to the first embodiment will be described. The standard data specifier 30 generates the procedure data value that is the value indicating the standard data corresponding to each section obtained by dividing the sensor data string "x". A procedure data value $l_m$ is the procedure data value generated in the m-th section obtained by dividing the sensor data string "x", and is a standard data string STD ($l_m$) corresponding to the m-th section obtained by dividing the sensor data string "x".

The standard data specifier 30 in the first embodiment generates the procedure data value $l_m$ by using an elastic matching method such as multiple sequence alignment for a sequence $\{c_1, c_2, \ldots, c_M\}$ of the class numbers $c_m$ included in the class data string $s_m$ calculated by the class data calculator 20 and a sequence obtained by connecting a plurality of sequences of the standard class numbers included in the standard data string STD ($l_m$). In the first embodiment, the standard data specifier 30 uses the elastic matching method for a sequence $\{STDc_1, STDc_2, \ldots, STDc_F, STDc_1, STDc_2, \ldots, STDc_F\}$ obtained by connecting two sequences of the standard class numbers.

Since the cycle work performed by the working entity 100 is repeated over a plurality of times, the sequence of the class numbers $c_m$ included in the class data string "s" may include the class number $c_m$ corresponding to the last operation of the cycle work and the class number $c_m$ corresponding to the first operation of the cycle work side by side. Even for such a sequence, the standard data specifier 30 can easily generate the procedure data value $l_m$ by comparison with the sequence obtained by connecting the plurality of sequences of the standard class numbers included in the standard data string STD ($l_m$) as described above. In a case where none of the plurality of pieces of the standard data corresponds to the m-th section obtained by dividing the sensor data string "x", the standard data specifier 30 calculates "NA" as the procedure data value $l_m$.

FIG. 14 is a set of tables for explaining a data structure of the procedure data values generated by the standard data specifier included in the work support device according to the first embodiment. FIG. 14 illustrates an associated data group 204 in which the class data string $s_m$ illustrated in FIG. 12 and the procedure data value $l_m$ generated by the standard data specifier 30 are arranged in association with each other. The associated data group 204 includes the procedure data values $l_m$ corresponding to the class data CD1 to CD4. In FIG. 14, data in which the class data CD1 and the procedure data value $l_m$ are associated with each other is indicated by data DL1, and data in which the class data CD2 and the procedure data value $l_m$ are associated with each other is indicated by data DL2. Moreover, data in which the class data CD3 and the procedure data value $l_m$ are associated with each other is indicated by data DL3, and data in which the class data CD4 and the procedure data value $l_m$ are associated with each other is indicated by data DL4. The standard data specifier 30 stores the associated data group 204 in the work performance storage device 34.

(Standard Data Specifier 30: Distinguishing Single Operation Included Multiple Times in Cycle Work)

Even in a case where a single operation is performed a plurality of times in the cycle work, the standard data specifier 30 can specify a procedure corresponding to each operation. That is, the standard data specifier 30 compares not only single class data but also the class data string $s_m$, which is the sequence of a plurality of pieces of the class data, and the standard data string STD ($l_m$), which is the sequence of the standard data, thereby being able to specify the procedure data value $l_m$ indicating the corresponding standard data even in a case where the cycle work includes a plurality of pieces of the class data having the same class number $c_m$.

(Section Evaluator 50)

Next, the section evaluator 50 according to the first embodiment will be described. The section evaluator 50 calculates the section evaluation value that is a value obtained by evaluating each section obtained by dividing the sensor data string "x". The section evaluator 50 calculates the section evaluation value by comparing the class data string $s_m$ with the corresponding standard data.

In the first embodiment, the section evaluator 50 calculates a section evaluation value $V_m$ for the section "m". The section evaluation value includes $V_m=\{Vb_m, Vc_m\}$. Here, "$Vb_m$" is a value obtained by evaluating whether or not the length $b_m$ of the m-th section obtained by dividing the sensor data string "x" exceeds a standard length STDb ($l_m$). The section evaluator 50 calculates "$Vb_m$" using the following expression (4). Here, "$len_{coef}$" is a specific coefficient and is set to $len_{coef}=1.5$ in the first embodiment. In addition, "$Vc_m$" is a value obtained by evaluating whether or not the class number $c_m$ of the m-th section obtained by dividing the sensor data string "x" matches the standard class number STDc ($l_m$). The section evaluator 50 calculates "$Vc_m$" using the following expression (5).

[Expression 4]

$$Vb_m = \begin{cases} \text{"Normal"} & (l_m \neq NA \text{ and } b_m \leq STDb(l_m) \times len_{coef}) \\ \text{"Abnormal"} & \text{(in other cases)} \end{cases} \quad (4)$$

[Expression 5]

$$Vc_m = \begin{cases} \text{"Normal"} & (l_m \neq NA \text{ and } c_m \leq STDc(l_m)) \\ \text{"Abnormal"} & \text{(in other cases)} \end{cases} \quad (5)$$

FIG. 15 is a set of tables for explaining a data structure of the section evaluation values calculated by the section evaluator included in the work support device according to the first embodiment. FIG. 15 illustrates an associated data group 205 in which the class data string $s_m$ illustrated in FIG. 14, the procedure data value $l_m$, and the section evaluation value $V_m$ calculated by the section evaluator 50 are arranged in association with one another.

The associated data group 205 includes the section evaluation values $V_m$ corresponding to the class data CD1 to CD4. In FIG. 15, data in which the class data CD1, the procedure data value $l_m$, and the section evaluation value $V_m$ are associated with one another is indicated by data DV1, and data in which the class data CD2, the procedure data value $l_m$, and the section evaluation value $V_m$ are associated with one another is indicated by data DV2. Moreover, data in which the class data CD3, the procedure data value $l_m$, and the section evaluation value $V_m$ are associated with one another is indicated by data DV3, and data in which the class data CD4, the section evaluation value $V_m$, and the procedure data value $l_m$ are associated with one another is indicated by data DV4.

By using the procedure data value $l_m$, the standard data corresponding to the m-th section obtained by dividing the sensor data string "x" can be expressed as "STD ($l_m$)". For example, the procedure data value in a second section of the data DV3 in FIG. 15 is the procedure data value $l_2=1$, and the corresponding standard data is STD (1)={STDb (1), STDc (1)}={8, 1} from FIG. 6. Moreover, in the second section of the data DV3, the class data is $s_2=\{a_2, b_2, c_2\}=\{3,$ 13, 1}. That is, according to expression (4), since $b_2=13>STDb$ (1)$\times len_{coef}=12$, $Vb_2=$"abnormal" is calculated.

The section evaluator 50 calculates "normal" or "abnormal" for each "$Vb_m$" and each "$Vc_m$", and registers the calculated values in the associated data group 205. The section evaluator 50 stores the associated data group 205 in the work performance storage device 34.

(Reliability Calculator 40)

Next, the reliability calculator 40 according to the first embodiment will be described. The reliability calculator 40 calculates the reliability $R_m$ for each section indicated by the class data string $s_m$ calculated by the class data calculator 20. The reliability $R_m$ is the reliability in the m-th section obtained by dividing the sensor data string "x". In the first embodiment, the reliability calculator 40 calculates, as the reliability $R_m$, the order of each of the sections counted from the latest one, the sections being obtained by dividing the sensor data string "x".

FIG. 16 is a set of tables for explaining a data structure of the reliabilities calculated by the reliability calculator included in the work support device according to the first embodiment. FIG. 16 illustrates an associated data group 206 in which the class data string $s_m$ illustrated in FIG. 15 and the reliability $R_m$ calculated by the reliability calculator 40 are arranged in association with each other.

The associated data group 206 includes the reliabilities $R_m$ corresponding to the class data CD1 to CD4. In FIG. 16, data in which the class data CD1 and the reliability $R_m$ are associated with each other is indicated by data DR1, and data in which the class data CD2 and the reliability $R_m$ are associated with each other is indicated by data DR2. Moreover, data in which the class data CD3 and the reliability $R_m$ are associated with each other is indicated by data DR3, and data in which the class data CD4 and the reliability $R_m$ are associated with each other is indicated by data DR4.

(Reliability Calculator 40: Variation of Reliability $R_m$)

Note that in the first embodiment, the reliability calculator 40 uses, for the calculation of the reliability $R_m$, the order of each section, which is obtained by dividing the sensor data string "x", counted from the tail thereof, but the present disclosure is not limited thereto. Each section and each class number $c_m$ indicated by the class data string $s_m$ in the first embodiment are newly calculated every time new sensor data is obtained. Thus, in the case where the sensor data is newly obtained, the reliability calculator 40 may set, as the reliability $R_m$, a degree of match obtained by comparing each section and each class number $c_m$ that are calculated last time with each section and each class number $c_m$ that are newly calculated. That is, the reliability calculator 40 may determine that as the degree of match is higher, the reliability $R_m$ of each section and each class number $c_m$ calculated is higher.

Alternatively, the reliability calculator 40 may set, as the reliability $R_m$, a time difference between a current time and an end time of each section obtained by dividing the sensor data, for example. That is, the reliability calculator 40 may determine that as the time difference is longer, the reliability $R_m$ of each section and each class number $c_m$ calculated is higher. Regarding the reliability $R_m$ described in all the examples above, the reliability $R_m$ is lower as a smaller number of pieces of the sensor data are obtained for the operation included in each section obtained by dividing the sensor data string "x", and the reliability $R_m$ is higher as a larger number of pieces of the sensor data are obtained.

Yet alternatively, the reliability calculator 40 may set, as the reliability $R_m$, a degree of match obtained by comparing the sensor data included in each section obtained by dividing the sensor data string "x" with the first template $g_j$ corresponding to the class number $c_m$ in each section. The reliability calculator 40 stores the associated data group 206 in the work performance storage device 34.

(Work Performance Storage Device 34)

The work performance storage device 34 stores the performance sensor data string obtained by arranging, in order of acquisition, the sensor data included in the section in which the reliability $R_m$ satisfies the criterion among the sections obtained by dividing the sensor data string "x".

The work performance storage device 34 further stores the performance class data string indicating each section and each class number $c_m$ of the performance sensor data string.

The work performance storage device 34 further stores the performance procedure data value that is the value indicating the standard data corresponding to each section obtained by dividing the performance sensor data string.

The work performance storage device 34 further stores the performance section evaluation value that is the section evaluation value $V_m$ in each section obtained by dividing the performance sensor data string.

The work performance storage device 34 stores the performance sensor data string, the performance class data string, the performance procedure data value, and the performance section evaluation value in accordance with an instruction from the reliability determiner 65.

(Reliability Determiner 65)

Next, the reliability determiner 65 according to the first embodiment will be described. The reliability determiner 65 determines whether or not the reliability $R_m$ in each section calculated by the reliability calculator 40 satisfies a specific criterion. In the first embodiment, the reliability determiner 65 determines that the criterion is satisfied if the reliability $R_m$ exceeds two. That is, the reliability determiner 65 calculates a determination result of the reliability $R_m$ in each section on the basis of whether or not the reliability satisfies $R_m>2$.

FIG. 17 is a set of tables for explaining a data structure of the determination results of reliability determined by the reliability determiner included in the work support device according to the first embodiment. FIG. 17 illustrates an associated data group 207 in which the class data string $s_m$ and the reliability $R_m$ illustrated in FIG. 16 and the determination result of the reliability $R_m$ determined by the reliability determiner 65 are arranged in association with one another. Here, a description will be made of a case where the criterion of the reliability $R_m$ is two, and the reliability determiner 65 determines that the reliability $R_m$ satisfies the criterion when $R_m>2$. In FIG. 17, a character string "True" written in a column of $R_m>2$ indicates that the reliability $R_m$ satisfies the criterion, and "False" indicates that the reliability $R_m$ does not satisfy the criterion.

The associated data group 207 includes the determination results of the reliability $R_m$ corresponding to the class data CD1 to CD4. In FIG. 17, data in which the class data CD1, the reliability $R_m$, and the determination result of the reliability $R_m$ are associated with one another is indicated by data DJ1, and data in which the class data CD2, the reliability $R_m$, and the determination result of the reliability $R_m$ are associated with one another is indicated by data DJ2. Moreover, data in which the class data CD3, the reliability $R_m$, and the determination result of the reliability $R_m$ are associated with one another is indicated by data DJ3, and data in which the class data CD4, the reliability $R_m$, and the determination result of the reliability $R_m$ are associated with one another is indicated by data DJ4. In the example of FIG. 17, only the reliability $R_1$ in the first section of the data DJ4 satisfies the criterion.

(Reliability Determiner 65: Second Support Information)

The reliability determiner 65 generates the second support information. The second support information in the first embodiment includes a section evaluation value $V_M$ in an M-th section obtained by dividing the sensor data string "x", operation name data LABEL $(l_M)$ corresponding to the M-th section, and first reference video data REF $(l_M)$ corresponding to the M-th section. As described above, "M" corresponds to the number indicating the latest section among the sections into which the sensor data string "x" is divided. Therefore, the second support information is information on the operation included in the latest section among the sections indicated by the class data string $s_m$. The reliability determiner 65 generates the second support information on the basis of the section evaluation value $V_M$, thereby enabling work support based on the length of time required for each operation or whether the class of each operation is correct or incorrect.

(Reliability Determiner 65: Updating Sensor Data String "x")

The reliability determiner 65 further removes, from the sensor data string "x", the sensor data included in the section in which the reliability $R_m$ satisfies the criterion, and updates the sensor data string "x" in the sensor data storage device 31.

Figures 18, 19:
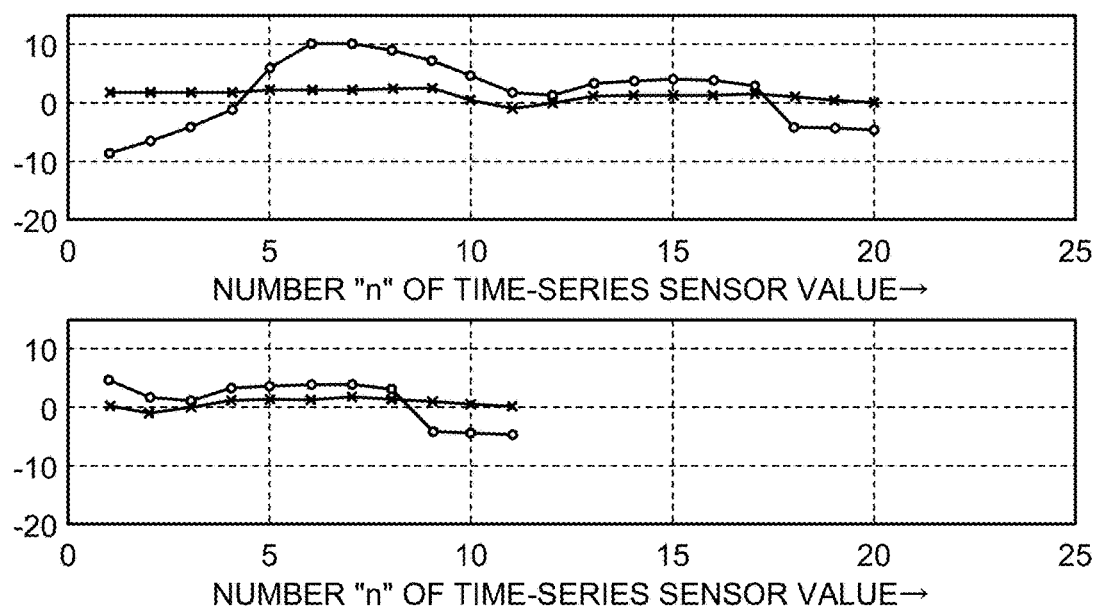
FIG. 18 is a set of graphs illustrating, in the form of time-series graphs, a sensor data string before and after sensor data is removed by the reliability determiner included in the work support device according to the first embodiment.
FIG. 19 is a table for explaining a data structure of a performance sensor data string stored in a work performance storage device included in the work support device according to the first embodiment.

FIG. 18 is a set of graphs illustrating, in the form of time-series graphs, the sensor data string before and after the sensor data is removed by the reliability determiner included in the work support device according to the first embodiment. A top graph in FIG. 18 represents the sensor data string "x" before the sensor data is removed by the reliability determiner 65, and is the same graph as the lowermost graph in FIG. 5.

The reliability determiner 65 according to the first embodiment determines that the reliability $R_m$ satisfies the criterion in the first section of the data DJ4 in FIG. 17, and thus removes a time-series sensor data string$_1$={x $(a_1)$, x $(a_2)$, . . . , x $(a_1+b_1-1)$}={x (1), x (2), . . . , x (9)} included in the first section obtained by dividing the sensor data string "x". A bottom graph in FIG. 18 represents the sensor data string "x" after the sensor data is removed by the reliability determiner 65. In the sensor data string "x", after {x (1), x (2), . . . , x (9)} is removed, {x (10), x (11), . . . , x (20)} before the removal becomes {x (1), x (2), . . . , x (11)} after the removal.

(Reliability Determiner 65: Adding Performance Sensor Data String)

The reliability determiner 65 further updates the performance sensor data string stored in the work performance storage device 34. In the first embodiment, the reliability determiner 65 adds, to the performance sensor data string, the sensor data included in the section in which the reliability $R_m$ satisfies the criterion among the sections obtained by dividing the sensor data string "x".

FIG. 19 is a table for explaining a data structure of the performance sensor data string stored in the work performance storage device included in the work support device according to the first embodiment. Since the sensor data is a two-dimensional value in the first embodiment, the work performance storage device 34 stores a performance sensor data string Hx (n2) as two values. In the first embodiment, the performance sensor data string includes Hx={Hx (1), Hx (2), . . . , Hx (N2)}. Here, "Hx (n2)" is the sensor data acquired in an n2-th place in the performance sensor data string Hx. Also, "N2" is the number of pieces of the sensor data included in the performance sensor data string Hx.

(Reliability Determiner 65: Adding Performance Class Data String)

The reliability determiner 65 further updates a performance class data string Hs stored in the work performance storage device 34. The performance class data string includes Hs={Hs$_1$, Hs$_2$, . . . , Hs$_{m2}$, . . . , Hs$_{M2}$}. Here, "M2" is the number of sections included in the performance class data string Hs, that is, the number of sections obtained by dividing the performance sensor data string Hx. Also, "m2" is a number for identifying each of the plurality of sections obtained by dividing the performance sensor data string Hx, and is an integer from one to "M2". The integer "m2" corresponds to the order of each of the plurality of sections in the performance sensor data string Hx. Moreover, "Hs$_{m2}$" is an element of the performance class data string Hs in an m2-th section obtained by dividing the performance sensor data string Hx, and Hs$_{m2}$={Ha$_{m2}$, Hb$_{m2}$, Hc$_{m2}$}. Here, "Ha$_{m2}$" is a start number of the m2-th section obtained by dividing the performance sensor data string Hx, "Hb$_{m2}$" is a length of the m2-th section obtained by dividing the performance sensor data string Hx, and "Hc$_{m2}$" is a class number by which the m2-th section obtained by dividing the performance sensor data string Hx is classified. With the use of the performance class data string Hs$_{m2}$={Ha$_{m2}$, Hb$_{m2}$, Hc$_{m2}$} for example, the time-series sensor data included in the m2-th section obtained by dividing the performance sensor data string Hx can be expressed as {Hx (Ha$_{m2}$), Hx (Ha$_{m2+1}$), . . . , Hx (Ha$_{m2}$+Hb$_{m2-1}$)}.

In the first embodiment, the reliability determiner 65 adds, to the performance class data string Hs, the section in which the reliability $R_m$ satisfies the criterion and the corresponding class number $c_m$ among the sections obtained by dividing the sensor data string "x".

(Reliability Determiner 65: Adding Performance Procedure Data Value)

The reliability determiner 65 further adds a new performance procedure data value to the work performance storage device 34. In the first embodiment, the reliability determiner 65 adds, as the new performance procedure data value, the procedure data value corresponding to the section in which the reliability $R_m$ satisfies the criterion among the sections obtained by dividing the sensor data string "x". The new performance procedure data value added by the reliability determiner 65 is a performance procedure data value Hl$_{m2}$ indicating the standard data corresponding to the m2-th section obtained by dividing the performance sensor data string Hx.

(Reliability Determiner 65: Adding Performance Section Evaluation Value)

The reliability determiner 65 further adds a new performance section evaluation value to the work performance storage device 34. In the first embodiment, the reliability determiner 65 adds, as the new performance section evaluation value, the section evaluation value $V_m$ in the section in which the reliability $R_m$ satisfies the criterion among the sections obtained by dividing the sensor data string "x". The performance section evaluation value in the m2-th section obtained by dividing the performance sensor data string Hx is a performance section evaluation value HV$_{m2}$={HVb$_{m2}$, HVc$_{m2}$}. Here, "HVb$_{m2}$" is a value obtained by evaluating whether or not a length Hb$_{m2}$ of the m2-th section obtained by dividing the performance sensor data string Hx exceeds a standard length STDb (Hl$_{m2}$). Also, "HVc$_{m2}$" is a value obtained by evaluating whether or not a class number Hc$_{m2}$ of the m2-th section obtained by dividing the performance sensor data string Hx matches a standard class number STDc ($Hl_{m2}$).

(Reliability Determiner 65: Performance Data)

FIG. 20 is a table for explaining a data structure of performance data stored in the work performance storage device included in the work support device according to the first embodiment. Performance data 208 stored in the work performance storage device 34 by the reliability determiner 65 includes the performance class data string $Hs_{m2}$, the performance procedure data value $Hl_{m2}$, and the performance section evaluation value $HV_{m2}$.

In the example of FIG. 20, the number of sections included in the performance class data string $Hs_{m2}$ is M2=1, where the performance sensor data string Hx illustrated in FIG. 19 is divided into one section. Values added for the performance procedure data value $Hl_{m2}$ and the performance section evaluation value $HV_{m2}$ illustrated in FIG. 20 are a procedure data value $l_1$, which indicates the standard data corresponding to the first section in which the reliability $R_m$ satisfies the criterion in the data DJ4 of FIG. 17, and a section evaluation value $V_1$, respectively.

(Reliability Determiner 65: First Support Information)

The reliability determiner 65 generates the first support information. The first support information in the first embodiment is the performance section evaluation value $HV_{m2}$ in each section obtained by dividing the performance sensor data string Hx and the operation name data corresponding to each section. The performance section evaluation value of the first support information is the performance section evaluation value $HV_{m2}$ in the m2-th section obtained by dividing the performance sensor data string Hx, and the operation name data of the first support information is operation name data LABEL ($Hl_{m2}$) corresponding to the m2-th section. The reliability determiner 65 generates the first support information on the basis of the performance section evaluation value $HV_{m2}$, thereby enabling work support based on the time required for each cycle work or missed work in each cycle work.

(Report Device 60)

Next, the report device 60 according to the first embodiment will be described. The report device 60 outputs the first support information and the second support information generated by the reliability determiner 65 to the display device 3. The first support information output from the report device 60 is information related to the operation included in the section in which the reliability $R_m$ satisfies the criterion among the sections obtained by dividing the sensor data string "x". The second support information output from the report device 60 is information related only to the operation included in the latest section among the sections obtained by dividing the sensor data string "x". Moreover, the report device 60 reports to repeatedly reproduce the first reference video data REF ($l_m$) in accordance with an instruction from the reliability determiner 65.

(Display Device 3)

Next, the display device 3 according to the first embodiment will be described. The display device 3 according to the first embodiment is an image forming device such as a liquid crystal display device. The display device 3 displays the first support information and the second support information reported by the report device 60 as videos, and presents the videos to the working entity 100.

Figure 21:
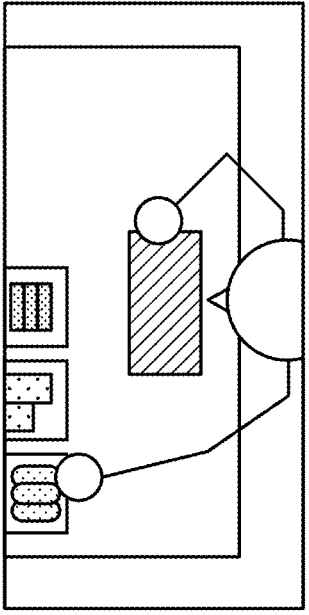
FIG. 21 is a diagram schematically illustrating a mode of first support information and second support information that are displayed on a display device by the work support device according to the first embodiment.

FIG. 21 is a diagram schematically illustrating a mode of the first support information and the second support information that are displayed on the display device by the work support device according to the first embodiment. FIG. 21 illustrates a case where the display device 3 displays, as the first support information, the performance section evaluation value $HV_1=\{HVb_1, HVc_1\}=\{$"normal", "normal"$\}$ in the first section (m2=1) illustrated in FIG. 20, and corresponding operation name data LABEL ($Hl_1$)=LABEL (1)="take out component A".

The first support information displayed on the display device 3 is, as described above, the information related to the operation included in the section in which the reliability $R_m$ satisfies the criterion among the sections obtained by dividing the sensor data string "x".

That is, the first support information is information having the reliability $R_m$ higher than that of the second support information. Thus, the first support information is information obtained by accumulating the information related to the operation included in the section having the high reliability $R_m$. Displaying the first support information enables work support based on the information having the high reliability $R_m$, and can prevent erroneous work support.

In FIG. 21, the display device 3 further displays, as the second support information, a section evaluation value $V_3=\{$"normal", "normal"$\}$ in a third section that is the latest section indicated by the data DV4 in FIG. 15, operation name data LABEL (13)=LABEL (3)="take out component B" corresponding to the third section, and first reference video data REF ($l_3$)=REF (3) corresponding to the third section. At this time, the first reference video data is repeatedly reproduced as described above.

Note that the second support information displayed on the display device 3 is, as described above, the information related only to the operation included in the latest section among the sections obtained by dividing the sensor data string "x". As described above, even right after the working entity 100 starts each operation included in the cycle work, the work support device 1 can estimate the section and the class number $c_m$ corresponding to each operation by the class data calculator 20. That is, the second support information enables work support based on information having high immediacy.

The display device 3 may be a head mounted display or the like to be worn on a body. Also, a speaker may be applied instead of the display device 3, and the speaker may report the first support information and the second support information by sound. Although the case has been described where the reference video data being a two-dimensional video is displayed as the second support information, the second support information is not limited thereto, and the reference video data may be displayed as a still image or as a three-dimensional video. Alternatively, the display device 3 may superimpose and display a path of movement of both hands on the reference video data. The work support device 1 may also include, in the first support information, a video indicating a series of operations in which the first reference video data is connected.

(Input Device 4)

Next, the input device 4 according to the first embodiment will be described. The input device 4 includes a device with which information can be input externally such as a mouse, a keyboard, a touch panel, a memory card reader, or the like. The input device 4 in the first embodiment inputs a signal of "start of operation" or "end of operation" received from the working entity 100 to the work support device 1. Upon receiving the signal of "start of operation" from the input device 4, the work support device 1 starts an operation corresponding to the signal of "start of operation". Meanwhile, upon receiving the signal of "end of operation" from the input device 4, the work support device 1 ends an operation corresponding to the signal of "end of operation". The work support device 1 according to the first embodiment operates as described above.

(Flowchart)

Figure 22:
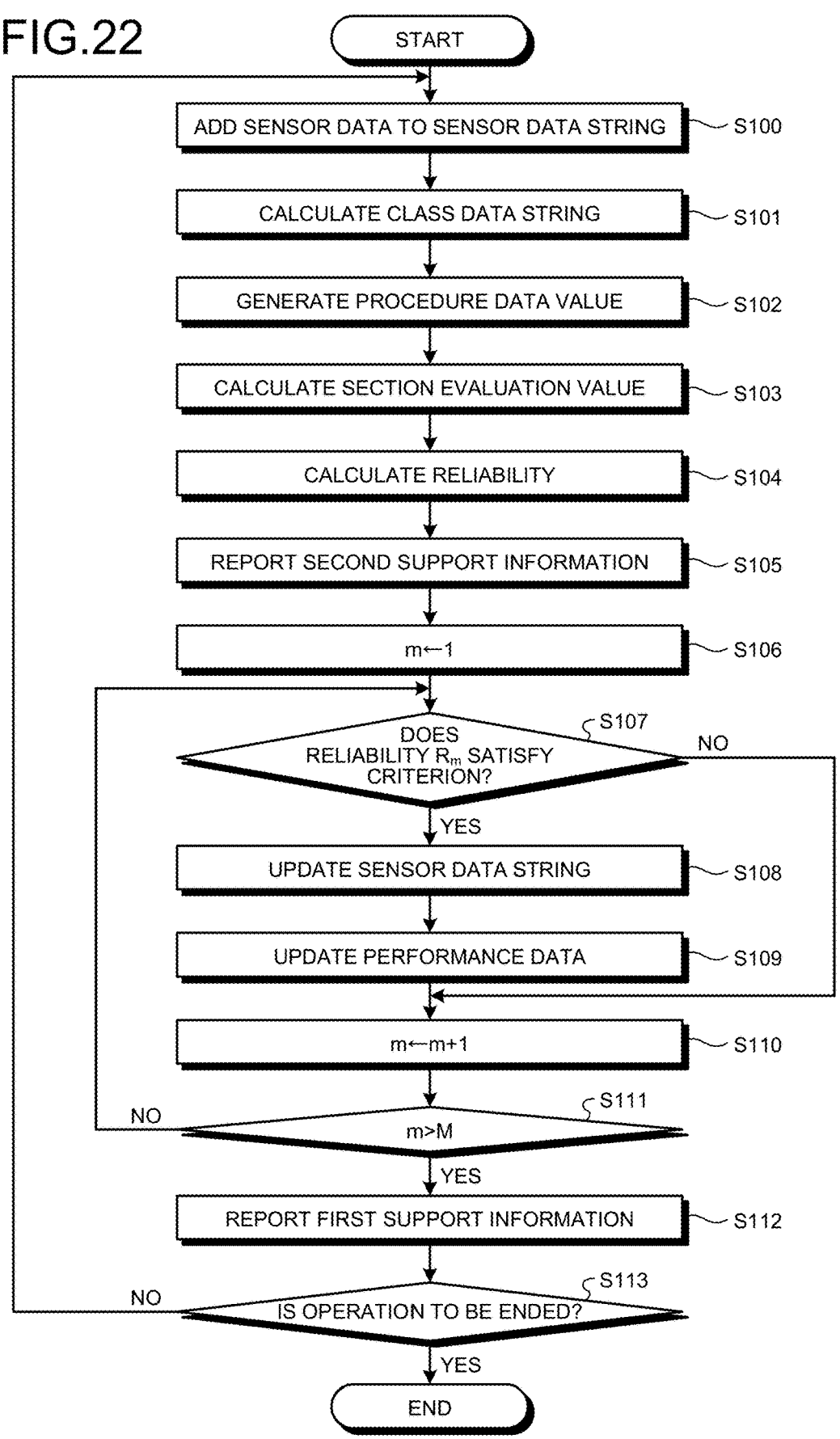
FIG. 22 is a flowchart illustrating a procedure of processing executed by the work support device according to the first embodiment.

Furthermore, the operation of the work support device 1 according to the first embodiment will be described with reference to a flowchart. FIG. 22 is a flowchart illustrating a procedure of processing executed by the work support device according to the first embodiment.

The sensor data input device 10 adds the sensor data newly acquired by the sensor 2 to the tail of the sensor data string "x" stored in the sensor data storage device 31 (step S100).

Next, the class data calculator 20 calculates the class data string "s" on the basis of the sensor data string "x" stored in the sensor data storage device 31 and the first template $g_j$ stored in the work information storage device 32 (step S101).

Next, the standard data specifier 30 generates the procedure data value that is the value indicating the standard data corresponding to each section of the class data string "s" calculated by the class data calculator 20 (step S102).

Next, the section evaluator 50 calculates the section evaluation value $V_m$ for each section indicated by the class data string "s" calculated by the class data calculator 20 (step S103).

Next, the reliability calculator 40 calculates the reliability $R_m$ for each section indicated by the class data string "s" calculated by the class data calculator 20 (step S104).

Next, the reliability determiner 65 generates the second support information, and the report device 60 reports the second support information (step S105).

Next, the reliability determiner 65 substitutes "1" into the number "m" for identifying each section obtained by dividing the sensor data string "x" (step S106).

Next, the reliability determiner 65 determines whether or not the reliability $R_m$ in the m-th section obtained by dividing the sensor data string "x" satisfies the criterion (step S107). If the reliability $R_m$ satisfies the criterion (Yes in step S107), the operation of the work support device 1 proceeds to step S108. On the other hand, in step S107, if the reliability $R_m$ does not satisfy the criterion (No in step S107), the work support device 1 proceeds to step S110.

If the reliability $R_m$ satisfies the criterion, the reliability determiner 65 removes, from the sensor data string "x", the sensor data included in the section in which the reliability $R_m$ satisfies the criterion, and updates the sensor data string "x" (step S108).

Next, the reliability determiner 65 updates the performance data 208 for the section in which the reliability $R_m$ satisfies the criterion (step S109). Specifically, the reliability determiner 65 updates the performance sensor data string Hx, the performance class data string Hs, the performance procedure data value $Hl_{m2}$, and the performance section evaluation value $HV_{m2}$ for the section in which the reliability $R_m$ satisfies the criterion.

Next, the reliability determiner 65 adds "1" to "m" (step S110). The reliability determiner 65 then determines whether or not "m" exceeds the number of sections "M" included in the class data string "s", that is, whether or not m>M (step S111).

If "m" does not exceed "M" (No in step S111), the operation of the work support device 1 returns to step S107. On the other hand, in step S111, if "m" exceeds "M" (Yes in step S111), the operation of the work support device 1 proceeds to step S112.

If "m" exceeds "M", the reliability determiner 65 reports the first support information to the display device 3 (step S112).

Next, the work support device 1 checks a signal input from the input device 4 and determines whether or not the operation is to be ended on the basis of the input signal (step S113). If the signal of "end of operation" is not input from the input device 4 (No in step S113), the operation of the work support device 1 returns to step S100. On the other hand, if the signal of "end of operation" is input from the input device 4 (Yes in step S113), the work support device 1 ends the operation.

(Hardware Configuration)

Next, a hardware configuration for implementing the work support device 1 according to the first embodiment will be described. The functions of the sensor data input device 10, the class data calculator 20, the standard data specifier 30, the reliability calculator 40, the section evaluator 50, the report device 60, and the reliability determiner 65 in the work support device 1 may be implemented by processing circuitry. The processing circuitry may be a dedicated hardware device or a general-purpose device such as a central processing unit (also referred to as a CPU, a central processor, a processing unit, an arithmetic unit, a microprocessor, a microcomputer, a processor, or a digital signal processor (DSP)) that executes a program stored in a memory. Moreover, the functions of the sensor data storage device 31, the work information storage device 32, and the work performance storage device 34 may be implemented by a memory.

In a case where the processing circuitry is the dedicated hardware device, the processing circuitry may be, for example, a single circuit, a complex circuit, a programmed processor, a parallel-programmed processor, an application specific integrated circuit (ASIC), a field programmable gate array (FPGA), or a combination thereof. The functions of the sensor data input device 10, the class data calculator 20, the standard data specifier 30, the reliability calculator 40, the section evaluator 50, the report device 60, and the reliability determiner 65 may be individually or collectively implemented by the processing circuitry.

In a case where the processing circuitry is the CPU, the functions of the sensor data input device 10, the class data calculator 20, the standard data specifier 30, the reliability calculator 40, the section evaluator 50, the report device 60, and the reliability determiner 65 are implemented by software, firmware, or a combination of software and firmware. At least one of the software and the firmware is described as programs and stored in the memory. The processing circuitry implements the functions of the above units by reading and executing the programs stored in the memory. These programs may also cause a computer to execute a procedure or method of the operation of the sensor data input device 10, the class data calculator 20, the standard data specifier 30, the reliability calculator 40, the section evaluator 50, the report device 60, and the reliability determiner 65. Here, the memory may be, for example, a non-volatile or volatile semiconductor memory such as a random access memory (RAM), a read only memory (ROM), a flash memory, an erasable programmable ROM (EPROM), or an electrically erasable programmable ROM (EEPROM (registered trademark)), a magnetic disk, a flexible disk, an optical disk, a compact disc, a mini disc, or a digital versatile disc (DVD).

Note that the functions of the sensor data input device 10, the class data calculator 20, the standard data specifier 30, the reliability calculator 40, the section evaluator 50, the report device 60, and the reliability determiner 65 may be implemented partly by the dedicated hardware device and partly by the software or firmware. For example, the function of the sensor data input device 10 may be implemented by the processing circuitry as the dedicated hardware device, and the functions of the class data calculator 20, the standard data specifier 30, the reliability calculator 40, the section evaluator 50, the report device 60, and the reliability determiner 65 may be implemented by the processing circuitry reading and executing the programs stored in the memory.

Figure 23:
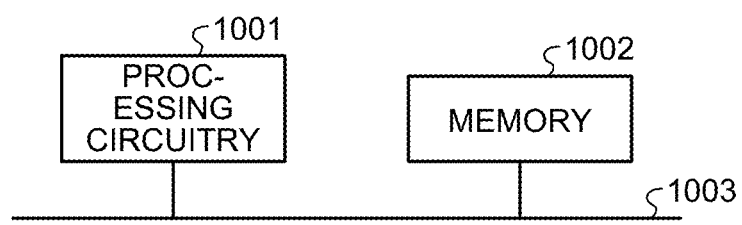
FIG. 23 is a diagram illustrating a first example of a hardware configuration of the work support device according to the first embodiment.

FIG. 23 is a diagram illustrating a first example of the hardware configuration of the work support device according to the first embodiment. FIG. 23 illustrates an example of the hardware configuration in a case where processing circuitry 1001 is the dedicated hardware device. In the example of FIG. 23, the functions of the sensor data input device 10, the class data calculator 20, the standard data specifier 30, the reliability calculator 40, the section evaluator 50, the report device 60, and the reliability determiner 65 are implemented by the processing circuitry 1001. Moreover, the functions of the sensor data storage device 31, the work information storage device 32, and the work performance storage device 34 are implemented by a memory 1002. The processing circuitry 1001 is connected to the memory 1002 via a data bus 1003.

Figure 24:
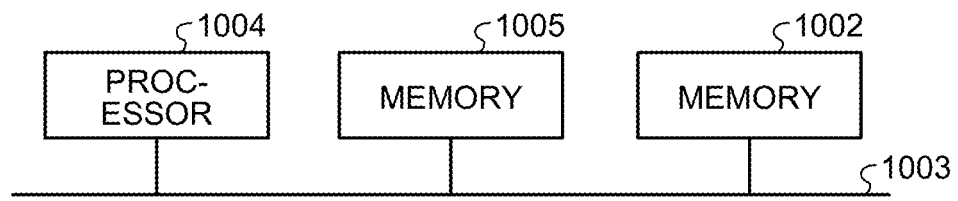
FIG. 24 is a diagram illustrating a second example of the hardware configuration of the work support device according to the first embodiment.

FIG. 24 is a diagram illustrating a second example of the hardware configuration of the work support device according to the first embodiment. FIG. 24 illustrates an example of the hardware configuration in a case where processing circuitry is the CPU. In the example of FIG. 24, the functions of the sensor data input device 10, the class data calculator 20, the standard data specifier 30, the reliability calculator 40, the section evaluator 50, the report device 60, and the reliability determiner 65 are implemented by a processor 1004 executing programs stored in a memory 1005. Moreover, the functions of the sensor data storage device 31, the work information storage device 32, and the work performance storage device 34 are implemented by the memory 1002. The processor 1004 is connected to the memory 1002 and the memory 1005 via the data bus 1003. Note that work support devices according to second and third embodiments can also be implemented by a hardware configuration similar to that of the work support device 1 according to the first embodiment.

As described above, according to the first embodiment, the work support device 1 reports the first support information on the basis of the reliability $R_m$ calculated for the result of detection of work performed by the working entity 100, thereby being able to prevent erroneous work support and execute accurate work support.

Moreover, the work support device 1 reports, as the second support information, the information on the operation included in the latest section among the sections indicated by the class data string $s_m$, thereby being able to perform work support based on the length of time required for each operation or whether the class of each operation is correct or incorrect.

Moreover, even right after the working entity 100 starts each operation included in the cycle work, the work support device 1 can estimate the section and the class number $c_m$ corresponding to each operation, and thus can perform work support based on information having high immediacy.

Furthermore, even in a case where a single operation is performed a plurality of times in the cycle work, the work support device 1 can specify the procedure corresponding to each operation and thus can execute accurate work support.

Second Embodiment

Next, a second embodiment will be described with reference to FIGS. 25 to 28. The shorter the length of the cycle work performed by the working entity 100, the higher the productivity, and the longer the length of the cycle work, the lower the productivity. The length of the cycle work is thus strongly related to the productivity, and is important information in work support. Also, in the cycle work performed by the working entity 100, work that needs to be performed is missed in some cases. Such missed work affects the quality of production, and thus is important information in work support.

A work support device according to the second embodiment supports improvement in the productivity and prevents reduction in the quality of work by specifying the length of the cycle work performed by the working entity 100 and missed work.

(Work Support Device 1A)

Figure 25:
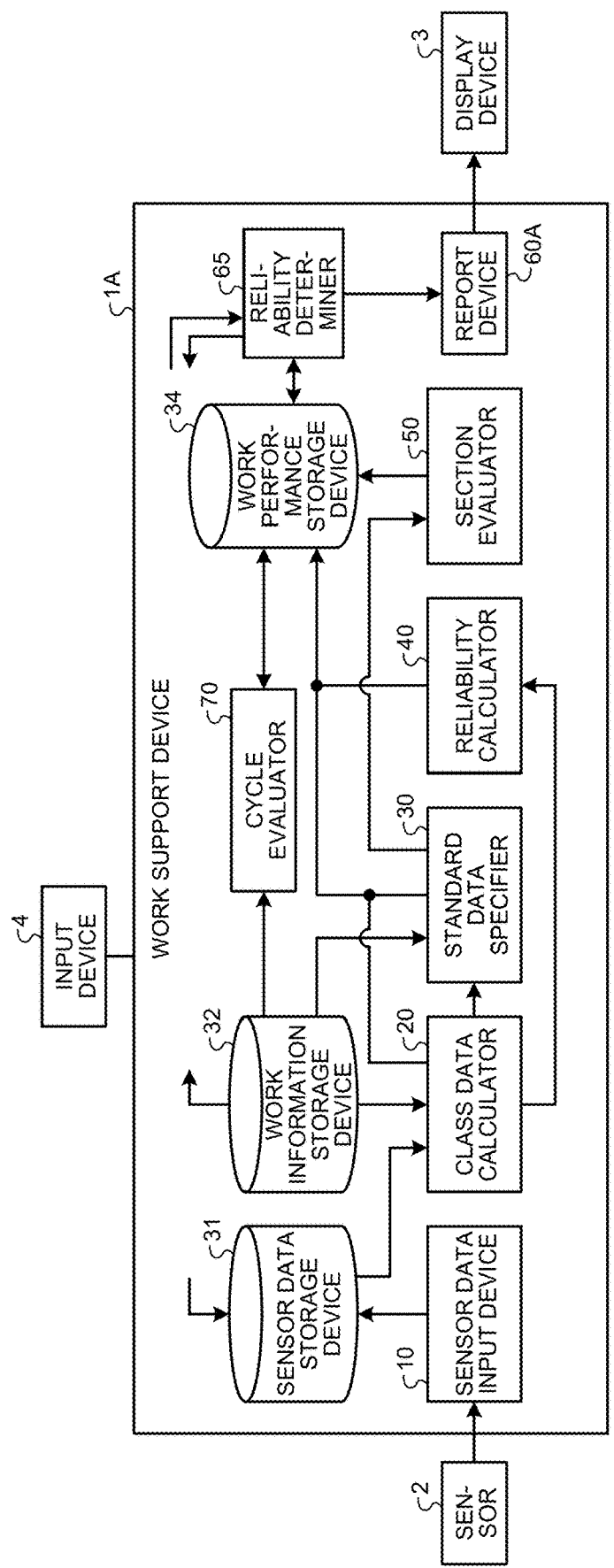
FIG. 25 is a diagram illustrating an example of a configuration of a work support device according to a second embodiment.

FIG. 25 is a diagram illustrating an example of a configuration of the work support device according to the second embodiment. Components in FIG. 25 that achieve the same functions as those of the work support device 1 of the first embodiment illustrated in FIG. 1 are assigned the same reference numerals as those assigned to the corresponding components in FIG. 1, and thus redundant description will be omitted.

A work support device 1A according to the second embodiment is different from the work support device 1 according to the first embodiment in that the length of the cycle work and missed work can be specified for a plurality of rounds of the cycle work including a series of a plurality of operations performed by the working entity 100.

The work support device 1A includes a report device 60A instead of the report device 60. Compared to the work support device 1 according to the first embodiment, the work support device 1A newly includes a cycle evaluator 70 and includes the report device 60A whose operation is partially different from the operation of the report device 60. With such configuration and operation, the work support device 1A can easily specify the length of the cycle work and the missed work for the plurality of rounds of the cycle work including the series of the plurality of operations performed by the working entity 100. Hereinafter, the work support device 1A will be described focusing on differences from the work support device 1 according to the first embodiment.

(Cycle Evaluator 70)

The cycle evaluator 70 according to the second embodiment will be described. The cycle evaluator 70 detects the length of the cycle work performed by the working entity 100 and the missed work on the basis of the performance procedure data value $Hl_{m2}$ stored in the work performance storage device 34 and the standard data string STD ($l_m$) stored in the work information storage device 32. The cycle evaluator 70 stores a detection result in the work performance storage device 34.

(Cycle Evaluator 70: Length of Cycle Work)

The cycle evaluator 70 performs determination on the performance procedure data value $Hl_{m2}$ for all the first to M2-th sections obtained by dividing the performance sensor data string Hx according to determination formulas expressed by the following expressions (6) and (7).

[Expression 6]

$$m2=1 \text{ or } Hl_{m2}<Hl_{m2-1} \tag{6}$$

[Expression 7]

$$m2=M1 \text{ or } Hl_{m2}>Hl_{m2+1} \tag{7}$$

In the expression, "M2" is the number of sections obtained by dividing the performance sensor data string Hx. Moreover, "m2" is a number for identifying each of a plurality of sections of the performance sensor data string Hx, and indicates the order of each of the plurality of sections in the performance sensor data string Hx. In a case where the determination formula expressed by expression (6) is satisfied in the m2-th section, the cycle evaluator 70 adds "m2" to a head section CVhead of the cycle work.

In a case where the determination formula expressed by expression (7) is satisfied in the m2-th section, the cycle evaluator 70 adds "m2" to a tail section CVtail of the cycle work. Here, the head section includes CVhead={CVhead (1), CVhead (2), . . . , CVhead (D)}. A head section CVhead (d) indicates a head section of a d-th cycle work performed by the working entity 100. The tail section includes CVtail={CVtail (1), CVtail (2), . . . , CVtail (D)}. A tail section CVtail (d) indicates a tail section of the d-th cycle work performed by the working entity 100. Here, "d" is a number for identifying each of the plurality of rounds of the cycle work performed by the working entity 100, and is an integer from one to "D". Also, "d" indicates the order of each of the plurality of rounds of the cycle work performed by the working entity 100. Moreover, "D" indicates the number of times the cycle work is performed by the working entity 100.

The cycle evaluator 70 further detects a length CVlen of the cycle work. The length includes CVlen={CVlen (1), CVlen (2), . . . , CVlen (D)}. Here, "CVlen (d)" is a length of the d-th cycle work performed by the working entity 100, and the cycle evaluator 70 can calculate "CVlen (d)" using expression (8).

[Expression 8]

$$\text{CVlen}(d)=Ha_{CVtail(d)}+Hb_{CVtail(d)}-Ha_{CVhead(d)} \qquad (8)$$

(Cycle Evaluator 70: Missed Work)

Next, the cycle evaluator 70 detects, as missed work, a number of the standard data not included in the sequence of the performance procedure data value $Hl_{m2}$ included in each cycle work. A more specific description will be given. A method by which the cycle evaluator 70 detects the missed work is different for the d-th cycle work and for a D-th cycle work, where d<D.

It is assumed that $Hl^d = \{Hl_{CVhead(d)}, Hl_{CVhead(d)+1}, \ldots, Hl_{CVtail(d)}\}$ is a sequence of the procedure data values included in the d-th cycle work performed by the working entity 100. The d-th cycle work where d<D is the cycle work that the working entity 100 has completed. That is, the d-th cycle work where d<D needs to include operations corresponding to all the first to F-th standard data included in the standard data string STD ($l_m$). As described above, "F" is the number of pieces of the standard data. That is, the cycle evaluator 70 evaluates whether or not a value of each of "1" to "F" is included in "$Hl^d$", and when there is a value "f" that is not included, detects that the operation corresponding to f-th standard data has been missed. At this time, the cycle evaluator 70 adds operation name data LABEL (f) to missed work CVmiss (d) in the d-th cycle work performed by the working entity 100.

The D-th cycle work is the cycle work that is being performed by the working entity 100. That is, the D-th cycle work needs to perform first to $Hl_{CVtail\ (D)}$-th operations included in the standard data string STD ($l_m$). Therefore, the cycle evaluator 70 evaluates whether or not values of "1" to "$Hl_{CVtail\ (D)}$" are included in "$Hl^D$", and when there is a value "f" that is not included, detects that the operation corresponding to the f-th standard data has been missed. At this time, the cycle evaluator 70 adds the operation name data LABEL (f) to missed work CVmiss (D) in the D-th cycle work performed by the working entity 100.

FIG. 26 is a table for explaining a data structure of performance data stored in the work performance storage device included in the work support device according to the second embodiment. As illustrated in FIG. 26, performance data 209 stored in the work performance storage device 34 includes the performance class data string $Hs_{m2}$, the performance procedure data value $Hl_{m2}$, and the performance section evaluation value $HV_{m2}$.

FIG. 27 is a table for explaining a data structure of detection result data detected by the cycle evaluator included in the work support device according to the second embodiment. Detection result data 210 includes the head section of the cycle work, the tail section of the cycle work, the length of the cycle work, and a type of the missed work that are detected by the cycle evaluator 70. That is, in the detection result data 210, the head section CVhead (d) of the cycle work, the tail section CVtail (d) of the cycle work, the length CVlen (d) of the cycle work, and the missed work CVmiss (d) are associated with one another.

According to expression (6), since the determination formula is satisfied in the first section and the eleventh section, the cycle evaluator 70 detects the head section CVhead={1, 11} of the cycle work. Also, according to the performance data 209 illustrated in FIG. 26, the number of sections included in the performance class data string $Hs_{m2}$ is twelve, or M2=12. At this time, according to expression (7), the determination formula is satisfied in the tenth section and the twelfth section. Therefore, the cycle evaluator 70 detects CVtail={10, 12}. The cycle evaluator 70 further detects the length CVlen={82, 13} of the cycle work by expression (8).

As described above, the number of pieces of the standard data is set to F=10. The number of times the cycle work is performed is set to D=2. In the first (d=1) cycle work where d<D, the cycle work includes the head section CVhead (1)=1 and the tail section CVtail (1)=10. Therefore, the cycle evaluator 70 evaluates whether or not a value of each of "1" to "10" is included in the sequence $Hl^1$={1, 2, 3, 4, 5, 6, 8, NA, 9, 10} of the performance procedure data value $Hl_{m2}$ included in the first cycle work, and detects that "7" is not included. In this case, the cycle evaluator 70 determines operation name data LABEL (7)="screw component C" with reference to FIG. 7. Therefore, the cycle evaluator 70 detects missed work CVmiss (1)={"screw component C"} in the first cycle work.

Moreover, in the second (D=2) cycle work, the cycle work includes the head section CVhead (2)=11 and the tail section CVtail (2)=12. Therefore, the cycle evaluator 70 evaluates whether or not values from "1" to "3" are included in $Hl^2=\{Hl_{11}, Hl_{12}\}=\{2, 3\}$, and detects that "1" is not included. At this time, according to FIG. 7, operation name data LABEL (1)="take out component A". In this case, the cycle evaluator 70 detects missed work CVmiss (2)={"take out component A"} in the second cycle work.

The cycle evaluator 70 stores the detected information in the work performance storage device 34. The information stored in the work performance storage device 34 by the cycle evaluator 70 is the detection result data 210 including the head section CVhead of the cycle work, the tail section CVtail of the cycle work, the length CVlen of the cycle work, and the missed work CVmiss. The reliability determiner 65 generates the first support information on the basis of the detection result data 210 stored in the work performance storage device 34 by the cycle evaluator 70.

(Report Device 60A)

Next, a report device 60A according to the second embodiment will be described. In addition to the output by the report device 60, the report device 60A further outputs, as the first support information, the head section CVhead of the cycle work, the tail section CVtail of the cycle work, the length CVlen of the cycle work, and the missed work CVmiss to the display device 3.

As a result, the work support device 1A can execute work support based on the time taken for each cycle work or the missed work in each cycle work.

FIG. 28 is a diagram schematically illustrating a mode of the first support information displayed on the display device by the work support device according to the second embodiment. FIG. 28 illustrates a case where the display device 3 displays, as the first support information, the value CVlen (d) [sec] indicating the length of the cycle work in seconds and the missed work CVmiss (d) indicating the type of the missed work in association with the number "d" for identifying the cycle work together with the first support information illustrated in FIG. 21.

In the second embodiment, since the work support device 1A acquires the sensor data every 200 milliseconds, the work support device 1A can calculate "CVlen (d) [sec]" by multiplying the length of work CVlen (d) by 0.2 seconds. By checking the first support information displayed on the display device 3, the working entity 100 can easily grasp how many times the cycle work has been performed, how long it has taken for one cycle, or whether there has been missed work in each cycle.

As described above, according to the second embodiment, the work support device 1A determines the head section CVhead of the cycle work and the tail section CVtail of the cycle work on the basis of the performance procedure data value $Hl_{m2}$ of each section, thereby being able to specify the length of the cycle work performed by the working entity 100. Moreover, the work support device 1A detects, as the missed work, the number of the standard data not included in the sequence of the performance procedure data value $Hl_{m2}$ included in the cycle work, that is, the performance procedure data value $Hl_{m2}$. The work support device 1A can thus specify and report the length of the cycle work performed by the working entity 100 and the missed work, thereby being able to support improvement in the productivity and prevent reduction in the quality of work.

Third Embodiment

Next, a third embodiment will be described with reference to FIGS. 26, 29, and 30. In a case where the working entity 100 is a person, for example, the working entity 100 may improve work while performing the work by changing the way he/she moves a hand or changing the place where a tool is put. In the case where the cycle work performed by the working entity 100 changes over time as just described, the cycle work may not match the information stored in the work information storage device 32, and the performance of work support may be reduced.

Specifically, in a case where the cycle work changes over time, for example, the series of the plurality of operations included in the cycle work performed by the working entity 100 does not match the first template $g_j$, and the accuracy of calculating the class data is reduced. Also, in the case where the cycle work changes over time, the content of the cycle work performed by the working entity 100 does not match the content of the reference video data, and becomes less appropriate as a reference of the cycle work. In order to solve these problems, the information stored in the work information storage device 32 needs to be updated to match the current cycle work, but such an update takes a lot of time and effort when performed manually.

A work support device according to the third embodiment maintains the performance of work support without manpower by automatically updating the information stored in the work information storage device 32 even in a case where the operation of the work performed by the working entity 100 changes over time.

(Work Support Device 1B)

Figure 29:
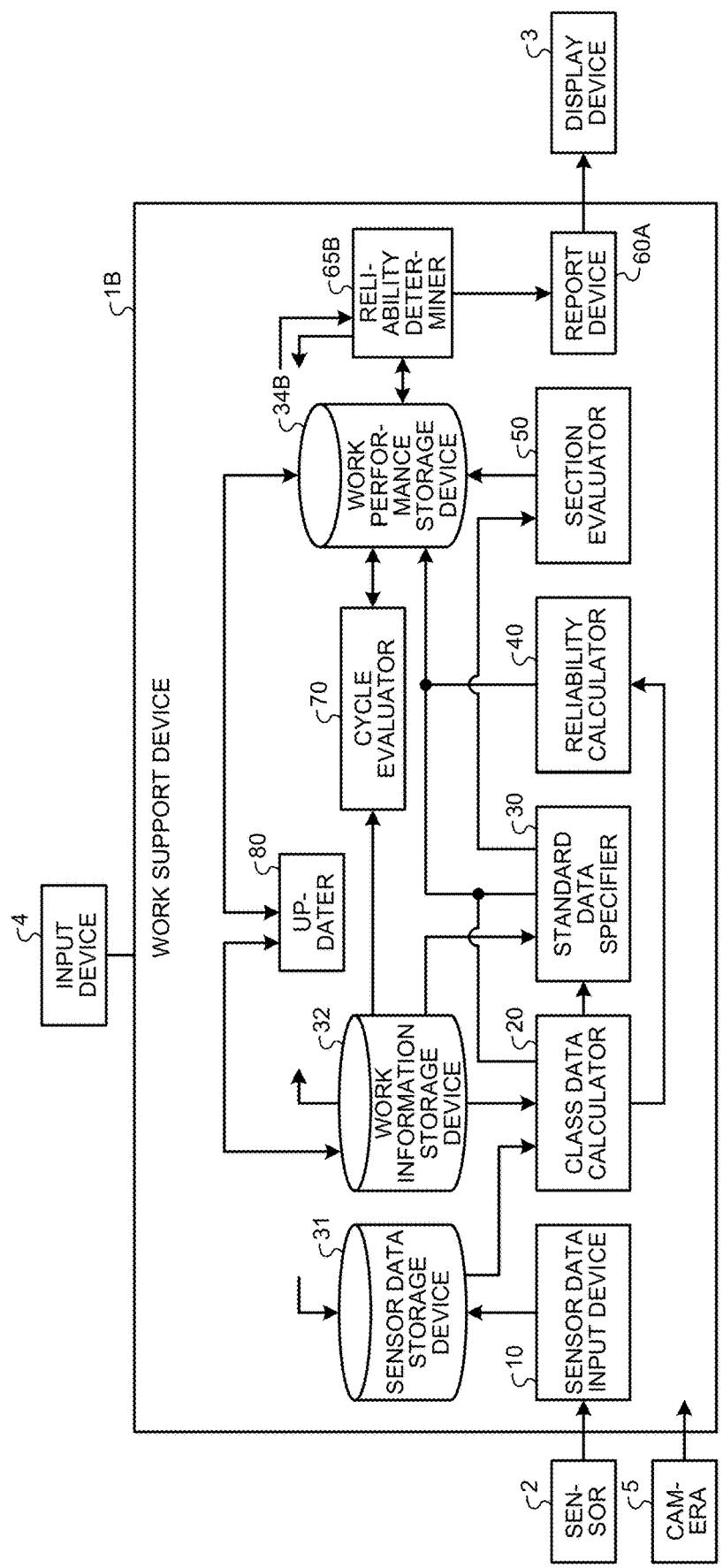
FIG. 29 is a diagram illustrating an example of a configuration of a work support device according to a third embodiment.

FIG. 29 is a diagram illustrating an example of a configuration of the work support device according to the third embodiment. Components in FIG. 29 that achieve the same functions as those of the work support device 1A of the second embodiment illustrated in FIG. 25 are assigned the same reference numerals as those assigned to the corresponding components in FIG. 25, and thus redundant description will be omitted.

A work support device 1B according to the third embodiment is different from the work support device 1A according to the second embodiment in that the information stored in the work information storage device 32 can be updated on the basis of information stored in a work performance storage device 34B for a plurality of rounds of the cycle work including a series of a plurality of operations performed by the working entity 100.

The work support device 1B includes a reliability determiner 65B instead of the reliability determiner 65, and includes the work performance storage device 34B instead of the work performance storage device 34. Compared to the work support device 1A according to the second embodiment, the work support device 1B newly includes an updater 80 and includes the reliability determiner 65B whose operation is partially different from the operation of the reliability determiner 65. Also, compared to the work support device 1A, in the work support device 1B, the data stored in the work performance storage device 34B is partially different from the data stored in the work performance storage device 34, and a camera 5 is newly connected. With such configuration and operation, the work support device 1B can easily update the information stored in the work information storage device 32 for the plurality of rounds of the cycle work including the series of the plurality of operations performed by the working entity 100. Hereinafter, the work support device 1B will be described focusing on differences from the work support device 1A according to the second embodiment.

The updater 80 is connected to the work information storage device 32 and the work performance storage device 34B. The updater 80 updates the information stored in the work information storage device 32. Details of the updater 80 will be described later.

Figure 30:
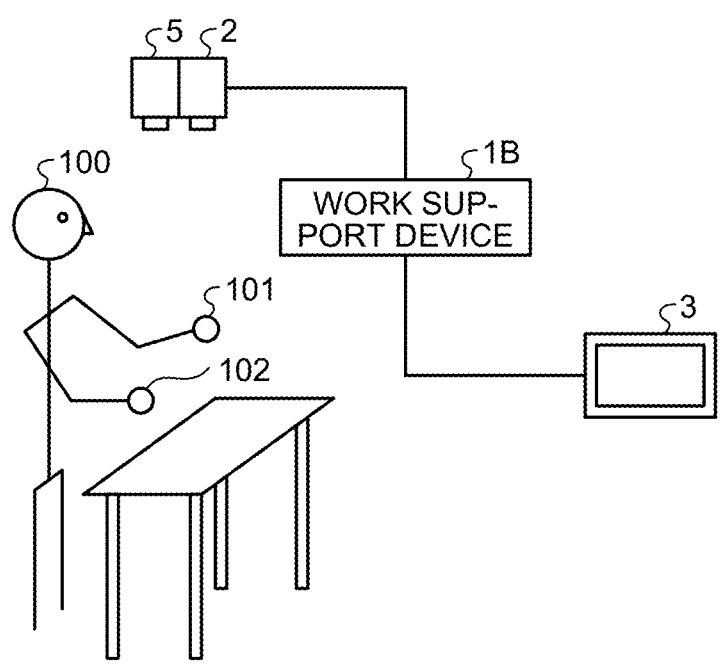
FIG. 30 is a diagram for explaining an example of use of the work support device according to the third embodiment.

FIG. 30 is a diagram for explaining an example of use of the work support device according to the third embodiment. In the third embodiment, the working entity 100 repeatedly performs the cycle work, which is work including the series of the plurality of operations, for a plurality of times.

(Camera 5)

The camera 5 outputs an image acquired by imaging the cycle work performed by the working entity 100 to the work support device 1B.

(Reliability Determiner 65B)

Next, the reliability determiner 65B included in the work support device 1B according to the third embodiment will be described. In addition to the processing executed by the reliability determiner 65, the reliability determiner 65B stores, as performance video data, a series of images acquired by the camera 5 in a section in which the reliability $R_m$ satisfies the criterion in the work performance storage device 34B.

(Updater 80)

Next, the updater 80 according to the third embodiment will be described. The updater 80 updates the information stored in the work information storage device 32 on the basis of information on the performance of operation stored in the work performance storage device 34B.

(Updater 80: Second Template)

The updater 80 generates a second template $g2_j$ for each class on the basis of the performance sensor data string Hx and the performance class data string Hs stored in the work performance storage device 34B. Here, "j" is a number for identifying each of the plurality of classes, and is an integer from one to "J". Moreover, "J" is the number of the classes, that is, the number of the second templates $g2_j$.

In the third embodiment, the updater 80 uses Gaussian process regression to generate the second templates $g2_j$ as a set including a Gaussian distribution of the sensor data at each time. The second templates include $g2_j=\{g2_j(1), g2_j(2), \ldots, g2_j(L)\}$. Here, "$g2_j(i)$" is a parameter of the Gaussian distribution of i-th sensor data in a section classified into the class "j", and $g2_j(i)=\{\mu2_j(i), \sigma2_j^2(i)\}$. Also, "$\mu2_j(i)$" is a mean of the Gaussian distribution, and "$\sigma2_j^2(i)$" is a variance of the Gaussian distribution. Moreover, "L" is the length of the second template $g2_1$, that is, represents a maximum value of the number of pieces of the sensor data included in each section obtained by dividing the performance sensor data string Hx. The first template $g_j$ and the second template $g2_j$ have the same length.

The second template $g2_j$ according to the third embodiment will be described more specifically. As described above, "$\mu2_j(i)$" is the mean of the Gaussian distribution of the i-th sensor data in the section classified into the class "j". As with the sensor data, "$\mu2_j(i)$" has a two-dimensional value. Moreover, "$\sigma2_j^2(i)$" is the variance of the Gaussian distribution of the i-th sensor data in the section classified into the class "j". In the third embodiment, it is assumed that the variance of the Gaussian distribution of the sensor data is similar in any dimension. Therefore, "$\sigma2_j^2(i)$" is a one-dimensional value.

The second template $g2_j$ can be estimated using a set $X_j$ of the sensor data in the section classified into the class "j" by the performance class data string Hs and a set $I_j$ of numbers corresponding to the sensor data being output in the section classified into the class "j" by the performance class data string Hs. Here, the sets include $X_j=\{X_j(1), X_j(2), \ldots, X_j(N3_j)\}$, and $I_j=\{I_j(1), I_j(2), \ldots, I_j(N3_j)\}$. For example, "$X_j(1)$" is sensor data that is output in an $I_j(1)$-th place in the section classified into the class "j".

Moreover, "$N3_j$" is the number of elements included in the sets "$X_j$" and "$I_j$". That is, "$N3_j$" is a sum of the number of pieces of the sensor data included in the section classified into the class "j" among the sections obtained by dividing the performance sensor data string Hx.

In the third embodiment, the updater 80 estimates the second template $g2_j(i)=\{\mu2_j(i), \sigma2_j^2(i)\}$ using the following expressions (9) and (10).

[Expression 9]
$$\mu2_j(i)=v_{j,i}^T(K_j+\beta^{-1}E)^{-1}X_j \tag{9}$$

[Expression 10]
$$\sigma2_j^2(i)=(k(i,i)+\beta^{-1})-v_{j,i}^T(K_j+\beta^{-1}E)^{-1}v_{j,i} \tag{10}$$

Here, "$\beta$" is a specific parameter, and "E" represents an identity matrix. Also, "$K_j$" is a matrix calculated by the following expression (11), and "$v_{j,i}$" is a vector calculated by the following expression (12). Moreover, "k" is a kernel function, for which a Gaussian kernel expressed by the following expression (13) can be used. In the expression, "$\theta_0$", "$\theta_1$", "$\theta_2$", and "$\theta_3$" are specific parameters in the kernel function "k".

[Expression 11]
$$K_j = \begin{bmatrix} k(I_j(1), I_j(1)) & k(I_j(1), I_j(2)) & \ldots & k(I_j(1), I_j(N2_j)) \\ k(I_j(2), I_j(1)) & k(I_j(2), I_j(2)) & \ldots & k(I_j(2), I_j(N2_j)) \\ \vdots & \vdots & \ddots & \vdots \\ k(I_j(N2_j), I_j(1)) & k(I_j(N2_j), I_j(2)) & \ldots & k(I_j(N2_j), I_j(N2_j)) \end{bmatrix} \tag{11}$$

[Expression 12]
$$v_{j,i} = \begin{bmatrix} k(i, I_j(1)) \\ k(i, I_j(2)) \\ \vdots \\ k(i, I_j(N2_j)) \end{bmatrix} \tag{12}$$

[Expression 13]
$$k(i_p, i_q) = \theta_0 \exp\left(-\frac{\theta_1}{2}|i_p - i_q|^2\right) + \theta_2 + \theta_3 i_p i_q \tag{13}$$

(Updater 80: Second Class Transition Probability)

The updater 80 according to the third embodiment further generates a second class transition probability P2(j|j') that is a probability of class transition on the basis of the performance class data string Hs stored in the work performance storage device 34B. The updater 80 calculates the second class transition probability using the following expression (14). Here, "$N4_{j',j}$" represents the number of times the class number in the m2-th section is the class number $c2_{m2}=j'$ and the class number in the (m2+1)-th section is the class number $c2_{m2+1}=j$ in the performance class data string Hs. Also, "$N5_j$" represents the number of times the class number is "j" in the performance class data string Hs. Moreover, "$\gamma$" is a specific parameter.

[Expression 14]
$$P2(j|j')=(N4_{j',j}+\gamma)/(N5_j+J\gamma) \tag{14}$$

(Updater 80: Second Reference Video Data)

The updater 80 according to the third embodiment further generates second reference video data REF2 (f), which is a video indicating the f-th operation included in the cycle work, on the basis of the performance video data stored in the work performance storage device 34B. As described above, "f" is the number for identifying each of a plurality of pieces of the standard data, and is an integer from one to "F". Also, as described above, "F" is the number of pieces of the standard data included in the cycle work, and is the number of operations designed in advance. The updater 80 that updates the second class transition probability is a first updater, and the updater 80 that updates the second reference video data is a second updater.

Here, update processing by the updater 80 will be described in detail with reference to FIG. 26. Here, a method in which the updater 80 generates the second reference video data REF2 (2) at f=2, for example, will be described.

The updater 80 first calculates the m2-th section where the performance procedure data value $Hl_{m2}=f$, $HVb_{m2}$="normal", and $HVc_{m2}$="normal". According to the example of FIG. 26, the updater 80 calculates a second section and an eleventh section. Next, the updater 80 calculates a section in which the length $Hb_{m2}$ of the section is minimum from the plurality of sections calculated. According to the example of FIG. 26, the length of the section for $m2=2$ is $Hb_2=8$, and the length of the section for $m2=11$ is $Hb_{11}=7$, whereby $m2=11$ is calculated. Next, on the basis of the start number $Ha_{m2}$ and the length $Hb_{m2}$ of the section in the m2-th section calculated, the updater 80 generates the second reference video data REF2 (f) from the performance video data stored in the work performance storage device 34B. According to the example of FIG. 26, for $m2=11$, the start number is $Ha_{11}=83$ and the length of the section is $Hb_{11}=7$. Since the performance class data string Hs is calculated for the sensor data string "x" acquired every 200 milliseconds, the updater 80 generates, as the second reference video data REF2 (2) at $f=2$, a section having a length of $7\times0.2=1.4$ seconds from $83\times0.2=16.6$ seconds from the beginning of the reference video data.

(Updater 80: Updating)

A data structure of the second template $g2_j$ generated by the updater 80 is the same as the data structure of the first template $g_j$ stored in the work information storage device 32. Also, a data structure of the second class transition probability generated by the updater 80 is the same as the data structure of the first class transition probability stored in the work information storage device 32.

The updater 80 further updates the first template $g_j$ stored in the work information storage device 32 with the second template $g2_1$. The updater 80 further updates the first class transition probability stored in the work information storage device 32 with the second class transition probability. The updater 80 further updates the first reference video data stored in the work information storage device 32 with the second reference video data.

As described above, in the third embodiment, the work support device 1B generates the second template $g2_j$ as a new template, the second class transition probability as a new class transition probability, and the second reference video data as new reference video data on the basis of the data stored in the work performance storage device 34B. As a result, even in a case where the cycle work performed by the working entity 100 changes over time, the data stored in the work information storage device 32 can be automatically updated with the generated data, whereby the performance as the work support device 1B can be maintained without manpower.

Variation

Note that the above first to third embodiments can also be applied to a case where the working entity 100 is other than a person. For example, in a case where the working entity 100 is a machine such as a work robot or a machine tool, an analyst of the work can grasp information such as occurrence of anomaly in the cycle work together with the reliability $R_m$ immediately after the occurrence of the anomaly, and thus the application of the first to third embodiments is effective.

The first support information according to the first to third embodiments may include the performance video data in the section in which the reliability $R_m$ satisfies the criterion. Moreover, the first support information according to the first to third embodiments may be information in which a plurality of pieces of the performance video data corresponding to sections having the same performance procedure data value $Hl_{m2}$ are reproduced simultaneously.

The work information storage device 32 stores the first template $g_j$ as the set including the Gaussian distribution of the sensor data at each time, but another appropriate probability distribution may be used instead of the Gaussian distribution.

The updater 80 generates the second template $g2_j$ as the set including the Gaussian distribution of the sensor data at each time, but another appropriate probability distribution may be used instead of the Gaussian distribution.

The sensor data input device 10 may include a detachable storage medium reader instead of being connected to the sensor 2. The sensor data input device 10 can thus read the sensor data string "x" measured in the past from the storage medium instead of acquiring the real-time sensor data string "x" detected by the sensor 2.

The section evaluator 50 may give an evaluation result indicting "abnormal" in a case where the length of each section obtained by dividing the sensor data string "x" is shorter than the corresponding standard length. The section evaluator 50 may also give an evaluation result indicting "abnormal" in a case where the similarity between the sensor data included in each section obtained by dividing the sensor data string "x" and the corresponding first template $g_j$ compared is low. Moreover, the updater 80 described in the third embodiment may be applied to the work support device 1 of the first embodiment.

The configurations illustrated in the above embodiments merely illustrate an example so that another known technique can be combined, the embodiments can be combined together, or the configurations can be partially omitted and/or modified without departing from the scope of the present disclosure.

REFERENCE SIGNS LIST 1, 1A, 1B work support device; 2 sensor; 3 display device; 4 input device; 5 camera; 10 sensor data input device; 20 class data calculator; 30 standard data specifier; 31 sensor data storage device; 32 work information storage device; 34, 34B work performance storage device; 40 reliability calculator; 50 section evaluator; 60, 60A report device; 65, 65B reliability determiner; 70 cycle evaluator; 80 updater; 100 working entity; 101 left hand; 102 right hand; 201, 203 time-series graph; 202 class data string; 204 to 207 associated data group; 208, 209 performance data; 210 detection result data; 1001 processing circuitry; 1002, 1005 memory; 1003 data bus; 1004 processor; CD1 to CD4 class data; DJ1 to DJ4, DL1 to DL4, DR1 to DR4, DV1 to DV4 data; G1 to G4, GA1 to GA4, GTa(1) to GTa(10), GTb(1) to GTb(10) time-series graph; SD1 to SD4 sensor data string.

The invention claimed is:

1. A work support device that supports work including a series of a plurality of operations to be performed by a working entity in a manufacturing process, the work support device comprising:

processing circuitry configured to:

receive a sensor data string in which sensor data obtained by measuring work of the working entity in the manufacturing process is arranged in order of acquisition;

classify operations performed by the working entity in the manufacturing process in real time by calculating a class data string indicating sections, which are obtained by dividing the sensor data string, by comparing the sensor data string with a template that is set for each of classes as a type of temporal change of the sensor data and is a set including a probability distribution of the sensor data at each time;

evaluate accuracy of the classified operations by calculating reliability of the sections for each section on the basis of information on the sections indicated by the class data string;

determine whether or not the reliability satisfies a criterion, generate, as first support information, information on an operation included in the section in which the reliability satisfies the criterion among the sections;

generate, as second support information, information on an operation included in a latest section among the sections;

remove, from the sensor data string, the sensor data included in the section in which the reliability satisfies the criterion; and report the first support information and the second support information in real time during the manufacturing process to guide the working entity and improve accuracy of the manufacturing process.

2. The work support device according to claim 1, wherein the processing circuitry is configured to calculate the class data string using a class transition probability that is a probability that the working entity performs a first operation corresponding to a first class of the classes and then performs a second operation corresponding to a second class of the classes.

3. The work support device according to claim 2, wherein the processing circuitry is configured to update the template and the class transition probability on the basis of performance of the operation.

4. The work support device according to claim 3, wherein the processing circuitry is configured to update the template using a Gaussian process regression based on accumulated performance data.

5. The work support device according to claim 1, wherein the processing circuitry is configured to:

generate a procedure data value indicating a value of standard data corresponding to the sections and including a temporal length of the operation;

calculate a section evaluation value, which is a value obtained by evaluating the sections, by comparing the class data string with the standard data in the procedure data value; and generate the first support information and the second support information on the basis of the section evaluation value.

6. The work support device according to claim 5, wherein the processing circuitry is configured to:

detect, as missed work, work of the standard data that is not included in the procedure data value corresponding to the section in which the reliability satisfies the criterion among the standard data; and generate the first support information on the basis of the missed work.

7. The work support device according to claim 5, wherein the processing circuitry is configured to generate the second support information by using reference video data that is a video indicating the operation.

8. The work support device according to claim 7, wherein the processing circuitry is configured to update the reference video data on the basis of performance of the operation.

9. The work support device according to claim 7, wherein the processing circuitry is configured to repeatedly reproduce the reference video data as part of the second support information.

10. The work support device according to claim 1, wherein the processing circuitry is configured to use, for calculation of the reliability, an order of the sections counted from a tail of the sensor data string.

11. The work support device according to claim 1, wherein the template includes a Gaussian distribution defined by a mean and a variance of the sensor data at each time for each class.

12. The work support device according to claim 1, wherein the processing circuitry is configured to use Forward Filtering-Backward Sampling to divide the sensor data string into the sections and classify each section into one of the classes.

13. The work support device according to claim 1, wherein the sensor data indicates a depth to a part of the working entity.

14. The work support device according to claim 1, wherein the processing circuitry is configured to:

receive sensor data every 200 milliseconds from a depth sensor detecting hand positions; and process five sequential sensor data points as a batch to enable real-time work monitoring.

15. A work support method for supporting work including a series of a plurality of operations to be performed by a working entity in a manufacturing process, the work support method comprising:

receiving a sensor data string in which sensor data obtained by measuring work of the working entity in the manufacturing process is arranged in order of acquisition;

classifying operations performed by the working entity in the manufacturing process in real time by calculating a class data string indicating sections, which are obtained by dividing the sensor data string, by comparing the sensor data string with a template that is set for each of classes as a type of temporal change of the sensor data and is a set including a probability distribution of the sensor data at each time;

evaluating accuracy of the classified operations by calculating reliability of the sections for each section on the basis of information on the sections indicated by the class data string;

determining whether or not the reliability satisfies a criterion;

generating, as first support information, information on an operation included in the section in which the reliability satisfies the criterion among the sections;

generating, as second support information, information on an operation included in a latest section among the sections;

removing, from the sensor data string, the sensor data included in the section in which the reliability satisfies the criterion; and reporting the first support information and the second support information in real time during the manufacturing process to guide the working entity and improve accuracy of the manufacturing process.

* * * * *